(12) United States Patent
Tame

(10) Patent No.: US 12,112,233 B2
(45) Date of Patent: Oct. 8, 2024

(54) SYSTEM AND METHOD FOR THE IMPARTING OF OPTICAL DIGITAL CPUS AND ROM'S TO DIVERSE PHYSICAL OBJECTS

(71) Applicant: Think4iR (Pty) Ltd, Rosebank (ZA)

(72) Inventor: Gavin Randall Tame, Rosebank (ZA)

(73) Assignee: Think4iR (Pty) Ltd, Rosebank (ZA)

( * ) Notice: Subject to any disclaimer, the term of this patent is extended or adjusted under 35 U.S.C. 154(b) by 0 days.

(21) Appl. No.: 17/800,419

(22) PCT Filed: Feb. 19, 2021

(86) PCT No.: PCT/IB2021/051423
§ 371 (c)(1),
(2) Date: Aug. 17, 2022

(87) PCT Pub. No.: WO2021/165903
PCT Pub. Date: Aug. 26, 2021

(65) Prior Publication Data
US 2023/0289547 A1    Sep. 14, 2023

(30) Foreign Application Priority Data
Feb. 21, 2020   (ZA) .................... 2020/01099

(51) Int. Cl.
*G06K 7/14*    (2006.01)
(52) U.S. Cl.
CPC ................. *G06K 7/1447* (2013.01)
(58) Field of Classification Search
CPC .... G06K 1/121; G06K 7/1417; G06K 7/1413; G06K 19/06028; G06K 7/1447; G06K 19/06037; G06K 15/1803; G06K 19/06009
See application file for complete search history.

(56) References Cited

U.S. PATENT DOCUMENTS

| | | | |
|---|---|---|---|
| 5,602,377 A | 2/1997 | Beller et al. | |
| 2005/0092839 A1 | 5/2005 | Oram | |
| 2012/0081747 A1* | 4/2012 | Kobayashi | B41J 3/50 358/1.15 |
| 2015/0278753 A1* | 10/2015 | Hookom | G06K 7/1443 235/385 |
| 2017/0124195 A1 | 5/2017 | Rothschild | |

FOREIGN PATENT DOCUMENTS

WO    WO-2019192061 A1 *  10/2019 ....... G06K 19/06009

OTHER PUBLICATIONS

Finzgar, "Use of NFC and QR code Identification in an Electronic Ticket System for Public Transport" (Year: 2011).*

* cited by examiner

*Primary Examiner* — Thien T Mai
(74) *Attorney, Agent, or Firm* — E. Eric Mills; Nicholas P. Stadnyk; Maynard Nexsen PC

(57) ABSTRACT

The invention relates to an article which includes an optical symbol which can be scanned/captured by an image capturing device. The optical symbol incorporates, or is encoded with (i) a set of instructions which are readable and executable by a computing device/processor; and (ii) data which is associated with the article. At least some of the instructions are configured such that, when a computing device/processor executes the instructions, the data is used by the device/processor during the execution of the instructions. The optical symbol may be a two-dimensional barcode or a three-dimensional barcode. The data may be read-only memory (ROM).

20 Claims, 16 Drawing Sheets

| Non-Pointer Instructions | Non-Pointer Instructions Are Mostly For Display Mostly For Direct Display With Data Incorporated In The Instruction Or To Lookup Tables Onboard The Downloaded Application | Pointer Instructions (Pointers To Lookups Or Databases) | Pointer Instructions May Be A List Of Many In According To The Command | Explanation | Non-Pointer Instruction Usage Example | Pointer Instructions Example |
|---|---|---|---|---|---|---|
| <T | EDML type reference | <t | Pointer to a lookup or database record for EDML type | The type of EDML or EDML reference name. Most of these will be extensions of the standards for EDMLS |  | <tC8< |
| <B | Barcode type | <b | Pointer to a lookup or database record of barcode types | Datamatrix, Aztec, Rode, PDF417, Snap3D | <BC3NP3D< | <bC10< |
| <R | RFID type | <r | Pointer to a lookup or database record of RFID types | There are a number of RFID types so this will normally be a pointer to a lookup table | <RCS-22HG< | <rL36839< |
| <19¹ᵢ | App identification with EDML | <192ᴸ | Pointer to a lookup table and app identifiers | This indicates which apps the EDML of the Object identifies with. | <19¹ᵢ SapD43< | <192ᴸL774884774< |
| <P | Physical object type | <p | Pointer to lookup or database record of physical objects | Product, physical items, person, card, documents and others | <PSPS Batch RTS laptop 211< | <pL2889111< |
| <C | Company or other institutions names and reference numbers | <c | Pointer to physical lookup or database record of object or company. | Product name, persons name, document name and other names. The pointer enables many institutional belonging | <CSB+G equipment< | <pL677688844< |
| <Q | Object unique serial or reference number | <q | Pointer to a lookup or database with unique serial numbers or ref numbers | This is an unique serial number, identify number or any number that is unique to the object. If this is a pointer, the object may have a number of different unique reference numbers | <QL400483098< | <qL3872778474< |
|  |  | <xi87ᵩ | Pointer to lookup table or database of the current company or institutions lookup table or database applies. This will apply to in this EDML. | ʌ |  |  |
| <X | The type of reference to that of <Q | <x | Pointer to a lookup or database of the type of serial or reference numbers. | Type of reference numbers for links. An object serial number, Id number, medical related number......A pointer to a list may have many | <XC58< | <xL26552< |
| <Q | Links to other objects | <q | Pointer to a lookup table or database to object links | These are reference numbers of companies that are linked or objects | <QL400483098< | <qL3872778474< |

Fig. 9a

| Non-Pointer Instructions | Non-Pointer instructions Are Mostly For Display Mostly For Direct Display With Data Incorporated In The Instruction Or To Lookup Tables Onboard The Downloaded Application | Pointer Instructions (Pointers to Lookups Or Databases) | Pointer instructions May Be A List Of Many In According To The Command | Explanation | Non-Pointer instruction Usage Example | Pointer instructions Example |
|---|---|---|---|---|---|---|
| <J | Julian date | <j | Pointer to a Julian date or more than one | The Julian data is a interger value representation of DDMMYYYY | <J473< | <jL77588859< |
| <T 185¶ | Time HH:MM:SS | <186¶ | Pointer to lookup or database of one or more times of HH:MM:SS | A single time can be stated or a range or different relevant times from a pointer to a lookup or database field | <SL400483098< | <SL588499333< |
| <S | Object IAN/EAN linear barcode reference number | <s | Pointer to lookup or database record list of ref number including IAN/EAN | The international IAN and EAN standards for linear barcodes. This is a standard for linear barcodes for type allocation and prices. | <SL400483098< | <SL588499333< |
| <Z | Area that the object belongs to. | <z | Pointer to lookup or database record list of ref of the object category areas | The area category of the object such as households, plants, people attributes (such as medical doctors, plumbers,...... This may point to a list of many. | <Doctor< | <zL458448098< |
| <N | Object reference number type | <n | Pointer to lookup or database object reference number types | The type of reference number that <Q is referring to -serial, ID, medical aid number, social security ......... | <NSID< | <nc200< |
| <T | Object description and information | <t | Pointer to lookup or database record for object descriptions and information | The pointer lookup or database fields of the object database possesses all the information such as information pieces, promos and all those with reference to the minute standard. | <TL48395499< | <tL86399584< |
|  |  | <= | Pointer to lookup or database for changing current status or event | These are events that have changed and the scanning recipient need to know about. This can be related to Date and time with the bridge instruction | <==138221< |  |
|  |  | <j | Pointer to record of the dataset | These are locations that the objects may not be permitted to be in. This is often used to track and trace. | <PC348< | <pL7449< |
|  | <177▒ | <176▒ | Pointer to the field of change the current value or entry of the dataset | These are locations that the objects may not be permitted to be in. This is often used to track and trace. | <PC348< | <pL7449< |
|  | Data to replace a pointed database, record whilled with |  | Pointer to the field of change the current value or entry of the dataset | These are locations that the objects may not be permitted to be in. This is often used to track and trace. | <PC348< | <pL7449< |
| <S | Physical location bounds | <s | Pointer to portable location bounds data | These are locations that the objects may not be permitted to be in. This is often used to track and trace. | <PC348< | <pL7449< |

Fig. 9b

| Non-Pointer Instructions | Non-Pointer Instructions Are Mostly For Display Mostly For Direct Display With Data Incorporated In The Instruction Or to Lookup Tables Onboard The Downloaded Application | Pointer Instructions (Pointers to Lookups Or Databases) | Pointer Instructions May Be A List Of Many In According To The Command | Explanation | Non-Pointer Instruction Usage Example | Pointer Instructions Example |
|---|---|---|---|---|---|---|
| <J | Julian date | <j | Pointer to lookup or database fields with Julian dates that may relevant many other instructions | This is the day month and year expressed in 5 characters | | |
| <V | Minute EDML inclusion for product | <v | Pointer to products minute EDML reference within the minimal EDMK database | This enable the inclusion of minimal EDML information products with medium EDML | <VL2772888< | <vL88299< |
| <M | Time | <m | Pointer to relevant time such as time spans, set times…..This may be used in combination with the Date | It may be relevant to locate many aspects of time such as time spans, expiry, events,promos. Usually used in combination with Jdate. | <MS12H00< | <m421< |
| <P | Encryption type | <p | Pointer to encryption type table of types of encryptions | Asymmetric and PKI encryption types and schemes. If a PKI scheme is selected a private key will be required to be in the object EDML.This can be used for any parameter of instructions as well as an entire range of functions | <PSR5A< | <pi22112< |
| <E | Encryption private key | <e | Pointer to physical object type encryption private keys | This is the key that was used for encryption. The key will remain relevant until a new one is specified | <EL3778849493< | <el7733 |
| <S | Encryption span of instructions | <e | | This is the span or range of the following instructions that are encrypted with the encryption type and encryption private key last stated | <SC8< | |
| <K | Password private key | <k | Pointer to a list of private keys for many different passwords | This public key or keys are for passwords. If the private key is a non-pointer and on the card it does not reveal the password but verifies it. The / or \ instruction will be used. | <KL337386< | <kl5884 |
| <W | Encrypted public key | <w | | A public key is not usually revealed outside of the virtual encryption. There are instances where it may be required in encryption scenarios. The public key must be encrypted with a private key encryption. | <WL0049940C4< | <wl77588477488 |
| <@ | Encryption for asymmetric encryption | | | A public key usually not revealed and | <@8599444833388 | |

Fig. 9c

| Non-Pointer Instructions | Non-Pointer Instructions Are Mostly For Display Mostly For Direct Display With Data Incorporated In The Instruction Or To Lookup Tables Onboard The Downloaded Application | Pointer Instructions (Pointers To Lookups Or Databases) | Pointer Instructions May Be A List Of Many In According To The Command | Explanation | Non-Pointer Instruction Usage Example | Pointer Instructions Example |
|---|---|---|---|---|---|---|
| </ | Range of following instructions that are encrypted | <\ | Pointer to lookup or database for the range of functions that are encrypted | Ranges of the following instructions to be encrypted with the current or last stated type of encryption type of encryption and private key last stated. | <//C21< | <!L885778< |
| <H | Function type that will be called to be executed | <h | A pointer to function type that will be called to be executed. | MPV executable, Java script, HTML, XML, executable,.....This function type will remain for further function call instructions until the next function type is specified in an instructions | <HCEDmath01< | <h!8849< |
| <_ | Function name | <_ | Pointer to lookup or database for selection of function names | This is a call for a function to be executed. The type will be that which was last stated in the function type and the function stated here will also remain until the next function name is stated | <-CVmy func< | <_LC039994003< |
| <" | Function name to execute on app | | | The default is to carry out functions on the MVP. This continuos until an instruction states that the functions are to be executed on the app and this status will remain untill | <CSapptunc1< | |
| <G | The parameter for the function, 0 for no parameter | <g | Pointer to lookup or database of image of list of image to be displayed on the app device. | The parameter for the function to be called | <GCCols< | <gL775884463< |
| <Y | Image to be displayed of application device | <y | Pointer to lookup data base of image of list of image to be displayed on the application device. | These are images that are to be displayed on the application device | <YCmyimage< | <yL477488833< |
| <I | Parameter to MPV of how images are to be displayed | <i | Pointer to a lookup or database with many images. | In the case of a pointer a parameter can be sent for choice | <iST & T soap< | <iL7488399993822< |
| <t | Instruction to indicate how many of the following instructions are related to the app | | | Informs how many of the next instructions are related are related specifically to the app | <C!10< | |
| <193⊥ | Which institution does the child belong to | <193⊥ | A pointer to the institutions that the child belong to | The child object of the institution stated above | <-I28458< | <-L883992< |
| <! | Child of which object | <@ | A pointer to lookup or database record of children of the objects. A pointer is used when there are many parents. | Number of products that are containers of a number of products are parents and those within are the children of such parents | <!Lo6477463< | <@L9888222< |

Fig. 9d

| Non-Pointer Instructions | Non-Pointer instructions Are Mostly For Display Mostly For Direct Display With Data Incorporated in The Instruction Or To Lookup Tables Onboard The Downloaded Application | Pointer Instructions (Pointers To Lookups Or Databases) | Pointer instructions May Be A List Of Many In According To the Command | Explanation | Non-Pointer Instruction Usage Example | Pointer Instructions Example |
|---|---|---|---|---|---|---|
| <18¢ǁ | Institution of parent object | <§ | Pointer to institution of parent object | This is the institution that the parent object belongs too | <ǁ14667< | <$L774884< |
| <# | Parent object | <220■ | Pointer to lookup table or database fields of parents | This is the parent object of the institution stated above | <#099477742< | <■L899888574< |
| <Z | Call for a certain app page | | | The call for certain app pages specific to the product | <ZC291< | |
| <^ | Binary true/false | | | The binary combination of a particular char, unsigned int or unsigned long is used for a true/false list. This is used in accordance with the lookup alternatives reference | <^16299991< | |
| <% | Bridge between complimentary instruction relationships | | | The bridge instruction is a complex logic statement. The bridge instruction I directs how many of the following instructions are relevant to the proceeding instruction | <%<ǁ1466<■L899888574<%< | |
| <* | Range of the following instructions applicable | | | A range marker that informs that the amount of the following instructions apply to the first listed one. | <*C2<UI4664<ÃC377< | |
| <U | URL address | | Pointer to lookup or database record of URLs | This is a call to the app to execute an URL | <UC201< | |
| <199Ã | A stated number of type indicated | | | | <Ã1266330< | |
| <X | Extra parameters for a called function | | | When a function is called this instruction can be used for the last called function or with the bridge instruction | <X§The main< | |
| <174« | Refer to entire minute EDML for an institution | <173ì | Pointer to entire minute EDML for an institution | A call to an minute table EDML of a certain institution. This is often used when only a few medium EDML instructions are required and for the rest the EDML minute will suffice | <«§ifecardv10< | <ìL377383< |
| <175» | Refer to entire minute EDML for an object | <211Ė | Pointer to entire minute EDML for an object | Refer to an object within a database or lookup that belongs is a record of an instruction database | <ĖL3773882991< | <ĖL3777388832< |

Fig. 9e

| Non-Pointer Instructions | Non-Pointer Instructions Are Mostly For Display With Data Incorporated In The Instruction Or To Lookup Tables Onboard The Downloaded Application | Pointer Instructions (Pointers To Lookups Or Databases) | Pointer Instructions May Be A List Of Many In According To The Command | Explanation | Non-Pointer Instruction Usage Example | Pointer Instructions Example |
|---|---|---|---|---|---|---|
| <0 | Off line transactions, how many of the next transactions | | | This indicates how many of the next transactions are to take place offline. Once this has been stated the relevant look ups and database must reside on the database for these commands | <0C10< | |
| <! | Extra parameters when a particular function is called. | | | This is for calling functions which require more than one parameter. The bridge instruction is used in combining with this instruction | <%<<<[!577758<Value<(!377738<%<< | |
| <= | Reference to any named or numeric database | <+ | Pointer to a reference to any named or numeric database | These can call or reference any database | <=$mainD< | <+L38882299< |
| <! | Name of data blob in EDML | | | This is a name of a data blob that is to follow | <!$Blob01< | |
| <# | Data blob type | | | The numeric type of future data blobs. This will remain for the next data blobs until a new on is specified | <#$.png< | |
| !63ù | Amount of characters in data blob | | | This enable the blob to be read, and not cause confusion when a <instruction indicator is part of the binary data within the blob | <ù61000< | |
| <^ | Data blob - unformatted binary data | | | This is an unformatted data blob of type stated. Unformatted does not mean unstructured such as a .png does have a structure | <^4773< | |
| <!53Ö | Get details of the user and store at location according to reference | <$ | | This is for control of what apps can access by permissions | <Ö!33473< | |
| <1 | Authorised for access, permissions to one or many areas or apps. | | | This is for control of what apps can access by permissions | <1C106< | <√ |
| <2 | Reference to get information from the app | <3 | Get information from the app in accordance with a reference lookup or database | A reference to a lookup or database with information for the application | <2$appSref< | <3L28829< |
| <4 | Reference to data to display on the app | <5 | Pointer get information from a lookup table or database that must be displayed on the app. | With regards to the above instruction, this reference to the field to display on the app | <4L2772888327< | <5L88222992< |

Fig. 9f

| Non-Pointer Instructions | Non-Pointer Instructions Are Mostly For Display Mostly For Direct Display With Data Incorporated In The Instruction Or To Lookup Tables Onboard The Downloaded Application | Pointer Instructions (Pointers To Lookups Or Databases) | Pointer Instructions May Be A List Of Many In According To The Command | Explanation | Non-Pointer Instruction Usage Example | Pointer Instructions Example |
|---|---|---|---|---|---|---|
| <6 | Reference to any database | <7 | Point reference to any database | This will be a alpha/numeric named database or a pointer to a numeric number database. It will remain for the next database instructions until it is changed | <6L28829991< | <5L999339993< |
| <8 | Reference to a record of a database | <9 | Pointer to a record of a database | | <8I2772< | <9L99883< |
| <1500 | Reference to a field d in data base | | | | <0L004993383< | |
| <T | This specifies where the database resides, on app, a location in the MVP, a URL...... | | | This specifies where the database resides, an app, the MVP, a URL...... | <tC010< | <+L38882299< |
| <156£ | The name or reference of the extension EDML | | | This is the name of the EDML and indicates that extended commands of this EDML will be used for the next instructions specified | <£10049920< | |
| <206₦ | The amount of characters until the end of the extended EDML | <193┴ | Pointer to a lookup table or database of extended commands | This is used as a character counter in order to determine where to resume with the current standard EDML | <₦15000< | <┴18884< |
| <199Å | Reference to a optical symbol record | <216₫ | Pointer to an optical symbol record | This refers to an optical Snapitings. | <ÅL200002992< | <iD377 73383938< |
| <204₦ | Store the content of the EDML with year, date, time and location with app user details when transaction takes place with the app | | | This is an instruction that requires the contents to be stored when transactions take place with an app. This can also be achieved by a call to a function on the app. A bridge and binary instruction can indicate what combination by reference. | <D0400399333884< | |
| <132Ő | When must the Snaptings transaction EDML contents be stored | | | This relates to the above instructions and instructs where the EDML contents is stored when a transaction takes place. This can be in a ledger database or blockchain | <ŐL488899993< | |
| <219▓ | Request a password, pin, iD number, name....for matching with current private key that is active. | | | This is a command to the app or via the app with the MVP for a password, pin, ID number, name....the password never appears on the Snaptings EDML, but only the private key | <▓C150< | |

Fig. 9g

SYSTEM AND METHOD FOR THE IMPARTING OF OPTICAL DIGITAL CPUS AND ROM'S TO DIVERSE PHYSICAL OBJECTS

CROSS REFERENCE TO RELATED APPLICATIONS

This application is a 35 U.S.C. § 371 U.S. national phase entry of International Application No. PCT/IB2021/051423 having an international filing date of Feb. 19, 2021, which claims priority to South African Patent Application No. 2020/01099 filed Feb. 21, 2020; the entireties of which are hereby incorporated by reference herein.

BACKGROUND OF THE INVENTION

This invention relates to an article with a digital optical symbol, that includes various amounts of directives/indications, instructions and ROM data that can be scanned/captured by an image capturing device. The invention also relates to a system for, and method of, performing one or more functions/operations which is/are related to the article. Furthermore, the invention relates to a method of making the article.

The "internet of things" (IoT) is a rapidly growing area of technology and, in general, refers to the interconnection of various electronic computing devices, which are incorporated into physical objects/devices, via the Internet. This interconnectivity enables the objects to send and receive data via Internet. At present however, IoT is largely limited to objects/devices which have/incorporate these electronic computing devices. As a result, many physical objects (e.g. chairs, desks, bottles, etc.) which do not have these IoT-enabled electronic computing devices, cannot form part of the IoT world.

There therefore exists a technical barrier between the "virtual world" and that of a "physical world of things". The "virtual word" refers to the electronic computerized world and all its interlinking and integration of logic electronic devices. The Internet is the prime and most significant virtual world within this context. The "physical world of things", on the other hand, refers to the physical things/objects outside the confines of the virtual world, which have no computer based electronic logic, such as chairs, desks, bottles, etc.

In the virtual world, endless amounts of software can be created for global networked and integrated solutions that are supported by sophisticated hardware, centralized servers and mobile devices. These mobile devices have processors that enable them to implement intelligent software for the creation of various diverse, networked-integrated solutions. However, the virtual world is limited in that there is no comprehensive direct interaction with things/objects which form part of the "physical world of things".

The reason for this is that many of these things/objects do not have any embedded intelligence in order to allow them to integrate into the "virtual world". As a result, creators and custodians of these things/objects cannot immediately trigger their desired and required processes when people and entities (e.g. institutions or companies) encounter these things/objects (e.g. when purchasing or transporting a particular product).

In some cases, these creators and custodians require changes to be made dynamically to unpredictable events. More specifically, it may require them to make changes in these encounters and transaction processes which may be linked to these encounters. The Inventors believe that the procedures and processes that applications carry out when encountering these things/objects, needs to have the ability to be altered at any time in the future, if needed.

It is however a big challenge to derive a single technology that is sufficiently comprehensive and effective to embrace the problematic scenario mentioned above.

The need for acquiring information directly from these things/objects (i.e. which form part of the "physical world of things"—hereinafter merely referred to as "things") into the virtual world, prompted the marking of "things" with information or data utilizing various different methods. One of the first movements towards imparting information to "things" was that of optical symbols that contained data in symbolic form (data represented by symbols such as varying width lines, squares and other shapes). The one dimension or linear barcode was the forerunner of a revolution in a huge and diverse range of information possesses concerning "things". The adoption was an IT revolution with its stunning rate of adoption, which is currently not abating. It is a simplistic technology that has a profound effect within "physical world of "things"". Even though this technology was and is noticeably effective, it only supplies a serial number that is acquired and related to its record within a database. These serial or reference number links must be understood by the acquiring application and the connection to the database records available at any point of acquisition of the data. The remote applications are however reliant on the connected software programs for the IT processes or only applications that supply numbers to these centralized IT process platforms. Remote device applications are largely just above the level of being "dumb terminals" to the host applications. This is no manner, conducive to the rapidly expanding area of mobile smart device applications with their powerful ability to carry out their own tasks. Instead of being a conduit between "things" and the IT process platform, smart device downloaded applications can carry out masses of information processing and pass on these processed results to information platforms.

On the back of success of the linear barcode, the two-dimension barcode emerged in the 1990's. This introduced a radical change in the marking of "things" with information. "Things" were able to be carriers of their own information rather than that of being a mere reference number. "Things" became the bearers of their own data records and wherever "things" may reside at a moment in time, so too does their data. This optical symbol data however, is only an unstructured record of information, and of late some of these have elementary structures for easier use by encountering applications. Three-dimension barcodes have also been developed and some even have the ability to incorporate up to one megabyte of data.

These barcodes however only contain static information which can be read. The Invenors believe that it is vital that the objects require a form of logic intelligence based on instructions and directives, in order for them to interact with the virtual internet in physical space, resulting in the interaction of the two internets, that of a virtual internet with that of a physical internet.

SUMMARY OF THE INVENTION

In accordance with a first aspect of the invention there is provided an article which includes an optical symbol which can be scanned/captured by an image capturing device, wherein the optical symbol incorporates, or is encoded with:

a set of instructions which are readable and executable by a computing device/processor; and data (hereinafter referred to as "article data") which is associated with the article, wherein at least some of the instructions are configured such that, when a computing device/processor executes the instructions, the article data is used by the device/processor during the execution of the instructions.

The term "optical symbol" refers to a symbol/code/label which represents data in a visual, machine/computer-readable form. An optical symbol can therefore be captured by an image capturing device and subsequently read by a computing device/processor (e.g. a smartphone with a camera or a scanner).

The optical symbol may also be encoded with a set of directives/indicators which are associated with, or correspond to, the set of instructions.

The set of instructions may be readable and executable by means of a software application which is executable by, or run on, a computing device/processor. The set of directives/indicators may also be readable by the software application.

The image capturing device may be a camera or scanner. The camera may be a digital camera. The camera may be a smart device camera, such as a smart phone camera.

The article may include a body and the optical symbol may be applied to the body.

The optical symbol may be a two-dimensional barcode or a three-dimensional barcode. The optical symbol may be printed on a portion of the article, such as a body of the article. Alternatively, the optical symbol may be applied onto the article by various different methods (e.g. it may be laser engraved or it may be applied through dot-peening.

The article data may be read-only memory (ROM).

The optical symbol may be encoded with a set of instructions which are readable and executable by a computing device/processor, wherein each instruction within the set is directed to a portion/part of the article data. More specifically, the set of instructions and article data may be structured such that, when a computing device/processor executes an instruction from the set of instructions, a portion/part of the article data is used during the execution. The article data may be divided into a set of data portions/sections, wherein each data portion/section corresponds with a particular instruction within the set of instructions.

The optical symbol may be encoded with a set of instructions and a set of directives/indicators which correspond with the set of instructions. The set of instructions and set of directives/indicators may be structured such that each instruction is associated with, linked to, or followed by, a particular directive/indicator. The directive/indicator may indicate how to read the portion/part of the article data to which the particular instruction is directed. The directive/indicator may also indicate the data type and/or size of the portion/part of the article data to which the particular instruction is directed. In other words, each instruction may have, or be followed by:

an associated directive/indicator; and a portion/part of the data to which the particular instruction is directed.

The article may be any physical article, object or product.

In accordance with a second aspect of the invention there is provided a method of performing one or more functions/operations which is/are related to an article in accordance with the first aspect of the invention, wherein the method includes:

receiving/obtaining an image of the optical symbol of the article in digital form; and utilising an application to read and execute the set of instructions, whereby the article data encoded in the optical symbol is used by the application during the execution.

The application may be executable by a processor. The application may more specifically be a software application, e.g. a mobile app.

One of the instructions may be to communicate with a system/database via a communication network. More specifically, the instruction may be to retrieve/obtain certain information from the system/database, via the communication network.

The method may include creating an electronic/portable data packet which includes the set of instructions and the article data which is associated with the article. The method may include sending the portable data packet via a network (e.g. the Internet) to another computing device/system/database/node.

The optical symbol may be a two-dimensional barcode or a three-dimensional barcode.

The optical symbol may be printed onto, or engraved in, the article (preferably a body of the article). Alternatively, the optical symbol may be printed/applied to a sticker which is stuck onto part of the article.

The utilising step may include utilising an application to read and execute the set of instructions, whereby the particular directive/indicator, which is associated with, linked to, or follows after, a particular instruction, is used by the application to understand how to read the portion/part of the article data to which the particular instruction is directed.

The set of instructions and set of directives may be structured with a language in order to enable optical symbols and mobile applications to express and carry out transactions according to a directive logic that is imparted by an embedded directive markup language within the optical symbols. This may enable articles/"things" to possess the potential of a form of artificial intelligence which is realized by the "thing"/mobile application transaction.

With reference to the set of instructions, the set of directives and ROM data in articles/"things" and the transaction with a block chain via mobile transactions: The method may include incorporating the set of instructions, the set of directives and ROM data in optical symbols on the articles/"things" into a transaction ledger information of blockchains. This may entail sending the set of instructions, the set of directives and ROM data to a blockchain ledger repository on each transaction. This may be part of other blockchain transaction data, such as location, date time and other details. As a result, the blockchain becomes a reflection of the physical world of transaction of "things"/articles, thereby resulting in a physical "thing"/article transaction blockchain.

In accordance with a third aspect of the invention there is provided a method of marking an article, wherein the method includes:

encoding at least the following into an optical symbol:

data (hereinafter referred to as "article data") which is associated with the article, and a set of instructions which are readable and executable by a computing device/processor, wherein at least some of the instructions are pointed/directed towards the article data so that the article data is utilised by the said instructions, when a computing device/processor executes the instructions; and marking the article with the optical symbol such that an image capturing device can capture an image of the optical symbol.

The encoding step may include utilising a processor, e.g. together with a software application, in order to encode the article data and set of instructions into the optical symbol.

The method may include structuring the set of instructions and article data into an electronic/portable data packet. The method may then include encoding the structured set of instructions and article data within the electronic/portable data packet into the optical symbol.

Each instruction within the set of instructions may be directed to a portion/part of the article data. More specifically, the set of instructions and article data may be structured such that, when a computing device/processor executes an instruction from the set of instructions, a portion/part of the article data is used during the execution. The article data may be divided into a set of data portions, wherein each data portion corresponds with a particular instruction within the set of instructions.

The method may include also encoding a set of directives/indicators which are associated with, or correspond to, the set of instructions, into the optical symbol. The set of instructions and set of directives/indicators may be structured such that each instruction is associated with, linked to, or followed by, a particular directive/indicator. The directive/indicator may indicate how to read the portion/part of the data to which the particular instruction is directed. The directive/indicator may also indicate the data type and/or size of a portion/part of the article data to which the particular instruction is directed. In other words, each instruction may have, or be followed by:
 an associated directive/indicator; and
 a portion/part of the data to which the particular instruction is directed.

The set of instructions may be readable and executable by means of a software application which is executable by a computing device/processor. The set of directives/indicators may also be readable by the software application.

The image capturing device may be a camera or scanner. The camera may be a digital camera. The camera may be a smart device camera, such as a smart phone camera.

The optical symbol may be a two-dimensional barcode or a three-dimensional barcode.

The step of marking the article with the optical symbol may include applying the optical symbol onto part of the article so that it can be captured by an image capturing device.

The data may be read-only memory (ROM).

The article may be any physical article, object or product.

In accordance with a fourth aspect of the invention there is provided a system for performing one or more functions/operations which is related to an article on which an optical symbol is provided, wherein the system includes:
 a receiving module which is configured to receive an image of the optical symbol, in digital form, wherein the image is encoded with:
  a set of instructions which are readable and executable by a computing device/processor, and
  data (hereinafter referred to as "article data") which is associated with the article,
  wherein at least some of the instructions are configured to utilise the article data such that, when a computing device/processor executes the instructions, the data is used during the execution; and
 an execution module which is configured to retrieve the set of instructions and article data from the optical symbol and execute the set of instructions.

The article may be an article in accordance with the first aspect of the invention.

In accordance with a fifth aspect of the invention there is provided a system for creating an optical symbol which is associated with a particular article, wherein the system includes an encoding module which is configured to encode at least the following into an optical symbol:
 data (hereinafter referred to as "article data") which is associated with the article, and
 a set of instructions which are readable and executable by a computing device/processor, wherein at least some of the instructions are pointed towards the article data so that the article data can be used when a computing device/processor executes the instructions.

The article may be an article in accordance with the first aspect of the invention.

In accordance with a sixth aspect of the invention there is provided a non-transitory computer-readable storage medium on which instructions are stored which, when executed by a computer/processor, are configured to encode at least the following into an optical symbol:
 data (hereinafter referred to as "article data") which is associated with the article, and a set of instructions which are readable and executable by a computing device/processor, wherein at least some of the instructions are pointed towards the article data so that the article data can be used when a computing device/processor executes the instructions.

The article may be an article in accordance with the first aspect of the invention.

BRIEF DESCRIPTION OF THE DRAWINGS

The invention will now be described, by way of example, with reference to the accompanying diagrammatic drawings. In the drawings:

FIGS. 9*a-g* show a table which indicates different instructions, describes them, and provides examples of the usage of each.

DESCRIPTION OF PREFERRED EMBODIMENTS

These optical marks are the most cost effective, simplistic and effective method of imparting data to a globe of trillions of highly different "things". The present invention evolves these optical symbols, and future developments within the area of optical symbol types, into so-called "smart symbols"

that can intelligently interact with mobile applications. Each optical symbol in accordance with the invention (also referred to as a "smart symbol" has a core set of instructions, directives and memory/data that software can make use of when executing the set of instructions.

In the present invention a uniquely structured, optical symbol is applied to an article/thing (e.g. a product, device or machine) and can be captured by an image capturing device, such as a camera (e.g. a smart phone camera). The optical symbol may be in the form of a two-dimensional barcode or a three-dimensional barcode and other types of optical symbols emerging. In one example, the optical symbol may be printed on a portion of the article, such as a body of the article. Alternatively, the optical symbol may be applied onto the article through engraving (e.g. it may be laser engraved) or dot-peening.

The optical symbol incorporates, or is encoded with:
a set of instructions which are readable and executable by a computing device/processor;
a set of directives/indicators which are associated with, or correspond to, the set of instructions; and
data (hereinafter referred to as "article data") which is associated with the article.

The instructions are configured such that, when a computing device/processor executes the instructions, the article data is used by the device/processor during the execution of the instructions.

Since the data contained within the optical symbol is static/fixed, it can be referred to as read-only-memory (ROM) data.

The set of instructions and set of directives/indicators are structured such that each instruction is associated with, linked to, or followed by, a particular directive/indicator. The directive/indicator, in turn, indicates how to read a portion/part of the article data to which the particular instruction is directed. The directive/indicator also indicates the data type and/or size of the particular portion/part of the data In other words, each instruction may have, or be followed by: (i) an associated directive/indicator, and (b) a portion/part of the data to which the particular instruction is directed.

In practice, the set of instructions and directives/indicators are readable and executable by means of a software application which is executable by, or run on, a computing device/processor, such as a smart phone. In other words, the software application may be in the form of a mobile app.

Figure 1:
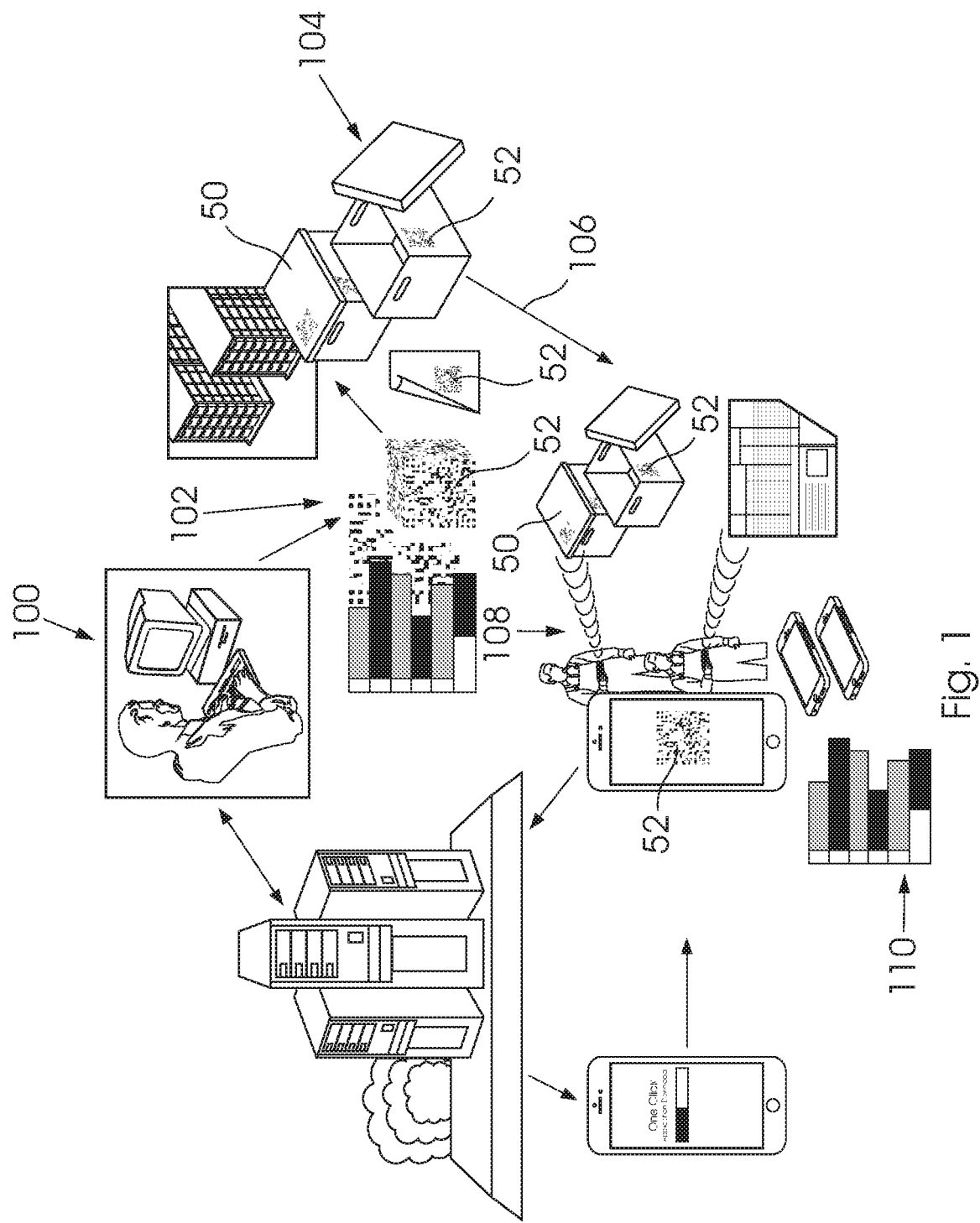
FIG. 1 shows an elementary overview of elements and processes that take place during the life cycle of the present invention.
Figure 7:
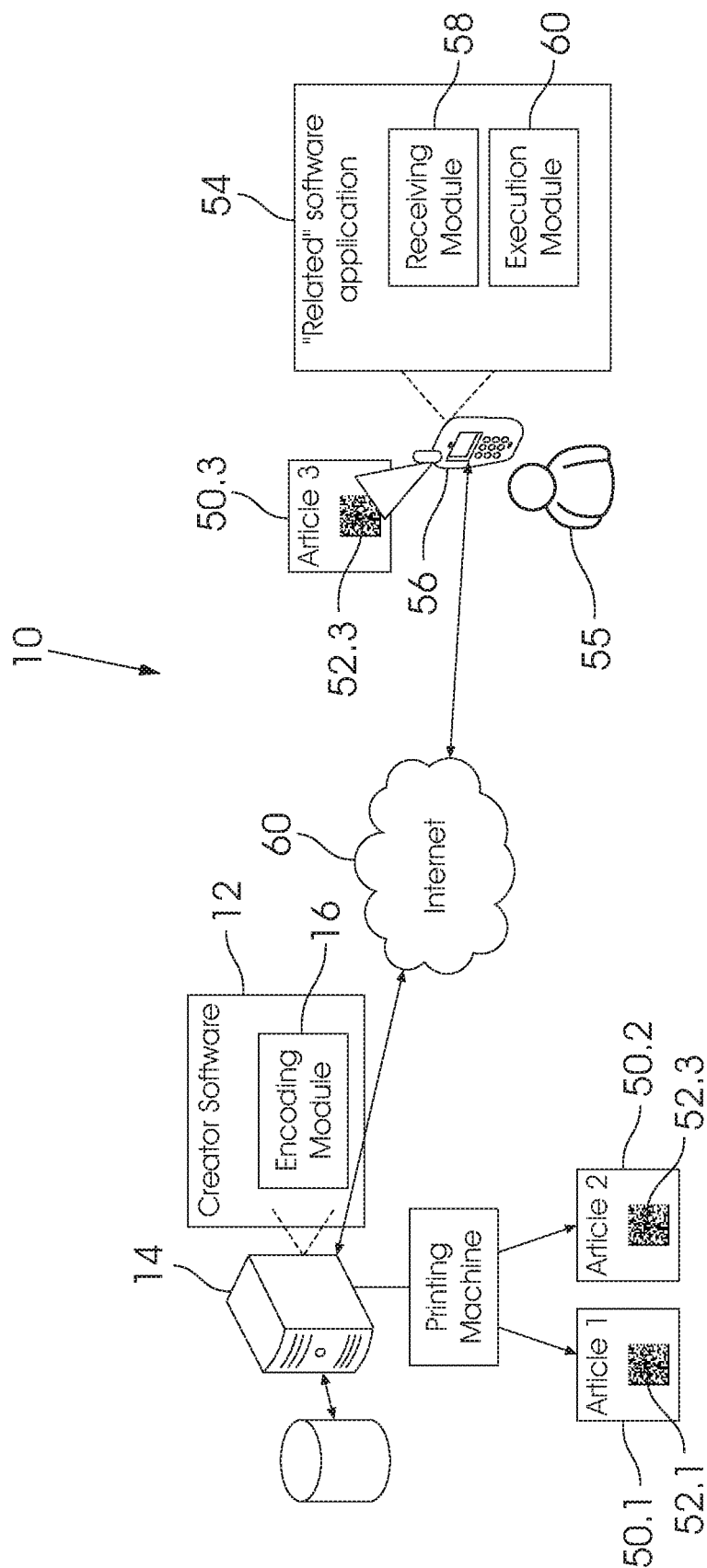
FIG. 7 shows a schematic layout of the system in accordance with the invention.

Reference is now specifically made to: FIG. 1 which depicts an elementary overview of the elements and processes that take place during the life cycle of the present invention; and FIG. 7 which provides a layout of the system 10 in accordance with the invention.

The term "thing set" hereinafter refers to a range of articles 50.1-50.3 (hereinafter collectively referred to as "50") that are classified and defined as the same/similar type (e.g. chairs).

In practice, all the articles 50 within the same "thing set" will have the same set of instructions and directives, but will have partially or completely different ROM data. In other words, for a set of chairs, the optical symbols 52.1-52.3 (hereinafter collectively referred to as "52") applied to the chairs will have the same set of instructions, but the ROM data contained in each symbol will differ from one another either partially or completely.

Software is typically developed in accordance with a company/institution's information requirements and the articles 50 that they are distributing (see reference numeral 100). In this regard, a creator (e.g. the designer/manufacturer of the article) utilizes the software (hereinafter also referred to as the "creator software" 12), together with one or more processors 14, to develop a set of instructions, which is then incorporated into the optical symbols 52 applied to the articles 50. More specifically, the creator software 12 typically implements an encoding module 16 in order to encode these instructions, together with associated directives/indicators and ROM data, into the optical symbols 52. These instructions are derived by bearing in mind the scope of certain tasks that the creator desires to be performed, when other, "related" software applications 54 encounter the article 50. These "related" software applications 54 refer to software applications which can typically be downloaded by certain entities/people and which are designed to interpret and execute the instructions contained in the optical symbols 52. In one example, the "related" software application 54 can be made available for download by the creator (e.g. in the form of a mobile app which is downloadable from an App store). The entities/people can then download the "related" software application 54, in order to allow them to interpret and execute the instructions contained in the optical symbols 52.

For example, a person 55 can download the "related" software application 54 onto his/her smart phone 56. When the person 55 encounters one of the articles 50, he/she can utilise a camera of the smart phone 56 to capture an image of the optical symbol 52 applied to the article 50.

In other words, when a person 55 is in possession of one of the articles 50 and captures its optical symbol 52 using an image capturing device (e.g. a phone camera or a scanner), the "related" software application 54 which is installed on a smart phone (or other computing device) of the person 55 is used to read and execute the instructions contained in the optical symbol 52. More specifically, the "related" software application 54 includes a receiving module 58 which is configured to receive a digitized version of the optical symbol 52 (i.e. captured by a camera) and an execution module 60 which is configured to execute the instructions contained in the optical symbol 52.

During the development of the optical symbol 52, the software (more specifically the encoding module 16) embeds the desired set of instructions and directives/indicators such that the articles 50 which form part of the same "thing set" (e.g. each chair which forms part of a set/group of chairs) has a common set of instructions and directives/indicators. However, the ROM data of each article 50 within the "thing set" differs from one another. It should be noted that the software can typically be developed for many diverse types of "thing sets".

Once the common set of instructions and directives/indicators have been developed for a "thing set", it will effectively serve as a template for all the articles 50 which form part of the "thing set", whereby the set of instructions and directives/indicators are used, together with individual ROM data for each article 50, in order to create individual optical symbols 52 for each article 50 within the "thing set". The "set of instructions and directives/indicators" is hereinafter also referred to as the "CPU".

More specifically, the software application used by the creator (i.e. the creator software 12) is configured to create a data representation with the common "CPU" and individual ROM for each article 50 within the "thing set" and this is encoded into optical symbol data form (typically a data image) that can be optically created/applied onto many different types of materials (see reference numeral 102). In one example, the optical symbols 52 can be printed onto the articles 50.

Once the optical symbols 52 are adhered/attached to the articles 50, the articles 50 themselves become the bearers of their own intelligent instructions and the data (i.e. the ROM data) that the instructions pertain too (see reference numeral 104). It can therefore be said that the application of the optical symbol 52 essentially transforms an article 50 into a "smart article" or "smart physical thing". As mentioned, these instructions are imparted by the creators, markers or custodians of the articles 50.

When an article 50 leaves its place of origin, it may travel throughout the world (see reference numeral 106). If a person/entity 55 at any stage encounters the article (see reference numeral 108), and has the "related" software application 54, the software application 54 can read and execute the set of instructions contained therein, by using the embedded ROM data (see reference numeral 110). In some instances, this can be done for as long as the creators of the marked articles 50 permit them to have interactions with the "related" software applications 54. More specifically, when a smart device application is required to be linked to, or connected to, an internet platform into operate the smart device application, the interaction processes may be prevented by an instruction within the optical symbol EDML language or by the platform.

An encounter between a "related" software application 54 and an optical symbol 52 may typically occur at any location around the globe. In one example, mobile smart devices 56 will capture the optical symbol 52 as images with their onboard digital cameras. The captured digital images are then decoded into electronic digital data and in this process the optical symbols are converted into a digital data file that contains the digital representations of the CPU's and ROM data. The articles 50 therefore effectively become objects of the electronic digital data world wherein they can now interact with many types of enabled/related downloaded software applications or even with enabled software on internet platforms.

As mentioned, the "related" software application 54 is typically downloaded and makes use of the CPU and the ROM data pertinent to each instruction, to carry out functions that were formulated by the originators/creators of the downloaded "related" software application 54. The downloaded, "related" software applications 54 are typically created or developed by the same institutions/entities that developed the software 12 which created/developed the relevant optical symbol 52. These "related" software applications 54 are developed to interact with the acquired CPU (i.e. the set of instructions and directives/indicators) and the ROM data pertinent to each instruction. These applications 54 are imparted with a capabilities of performing certain functions by reading and executing the CPU instructions, by utilizing the ROM data for each "CPU" instruction.

The downloaded smart device or other device applications may utilize the optical symbols instructions and ROM data from the optical symbol to execute functions without the need of connectivity with an internet platform. This is an offline smart device operation or transaction where the smart device application possesses the facilities to carry out such without connectivity with the platform. Information acquired or EDML instruction acquired from the optical symbols during a offline transaction or function process and these may be executed when connectivity with the platform is established subsequent to the smart device optical symbol process or transaction.

The data resulting from the interaction between a "related" software application 54 (e.g. in the form of a smart device mobile application) and an article 50 which has an optical symbol 52, which corresponds to the "related" software application 54, can be disseminated to many applications and each of these in turn can disseminate this to other applications. A single "related" software application 54 and article 50 encounter can trigger a large amount of application processes, in relation to it, across the entire global internet. An example of this is when an application encounters a symbol and carries out functions in accordance with it, certain processed data is created as a result of this. An instruction within the symbol 52 may prompt the application to disseminate this data as inputs to applications across the globe via the Internet. A simple example of this is when a symbol 52 is acquired from, for example, a chair. An instruction within the symbol 52 prompts the application to send its indicated serial number (contained within the ROM) and one or more instructions to certain online connected Internet applications that are indicated in a table of the "related" software application 54, wherein the instruction within the symbol 52 points to a specific part within the table. The "related" software application 54 then sends this data and instruction/s to these online applications (e.g. over the Internet) which then carry out the instructions received.

The CPU and ROM data acquired by the "related" software application 54 can also be sent via a network, such as the Internet 60, to various nodes/systems/platforms within the network 60. In other words, the CPU and ROM data are essentially transferred from their original, physical form (i.e. incorporated in the optical symbol 52) to an Internet platform. The CPU and ROM data can typically be incorporated into/form an electronic, portable data packet (PDP), which can be sent via the Internet 60 and/or other networks. These PDP's can effectively be seen as the electronic counterparts of the optical symbols 52. As a result, the article 50 (more specifically the CPU and ROM data which represent, or are associated with, the article 50) can "travel" and interact with "related" software applications 54 within the "electronic/virtual realm" in a similar way as they do outside of it (i.e. in the "physical realm"). When used in this manner, the CPU and ROM data essentially evolves into an electronic "thing"/article within the "virtual world". A practical example of this is when a chair's symbol 52 is acquired by a "related" software application 54, the instructions and directive and ROM data are acquired/decoded. An instruction prompts the application to dispatch the entire or parts of the contents (with all instructions, directives and ROM data to an online application on an Internet platform (this is referred to as a PDP, a portable data packet). This online application then places this in a database in accordance with an instruction within the PDP. The PDP may now be utilized by any application on the Internet that can access the database of chair symbols (PDPs) and make use of its instructions, directives and ROM. The chair symbol is now represented within the virtual Internet as it was in the physical Internet. The chairs (PDP) is now in a sense a "living" entity of the virtual world as it was in the physical world.

Figure 8:
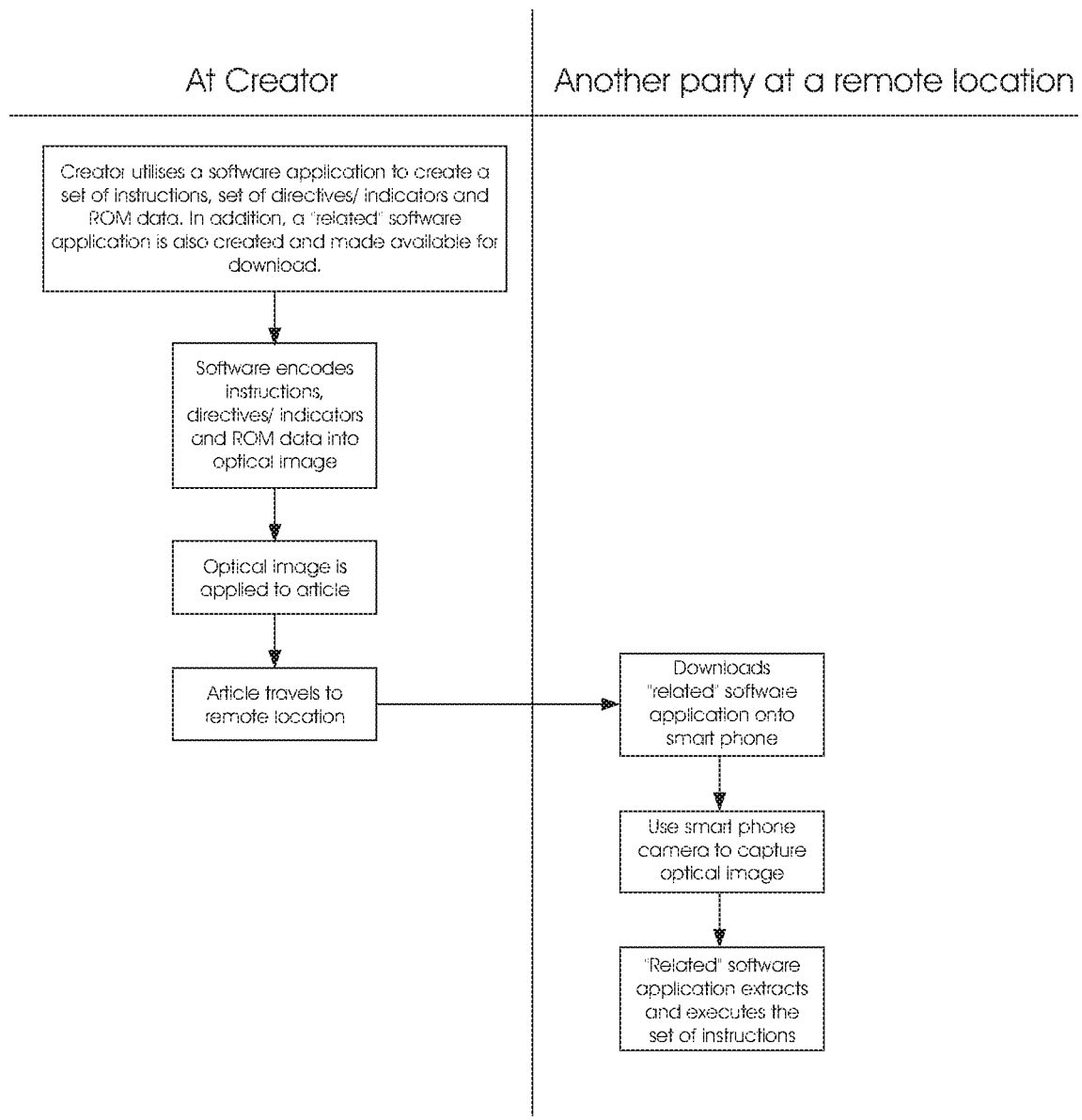
FIG. 8 shows a simplified flow diagram of a process flow of the present invention.

With regards to the general process flow, reference is also made to the flow diagram illustrated in FIG. 8.

Figure 2:
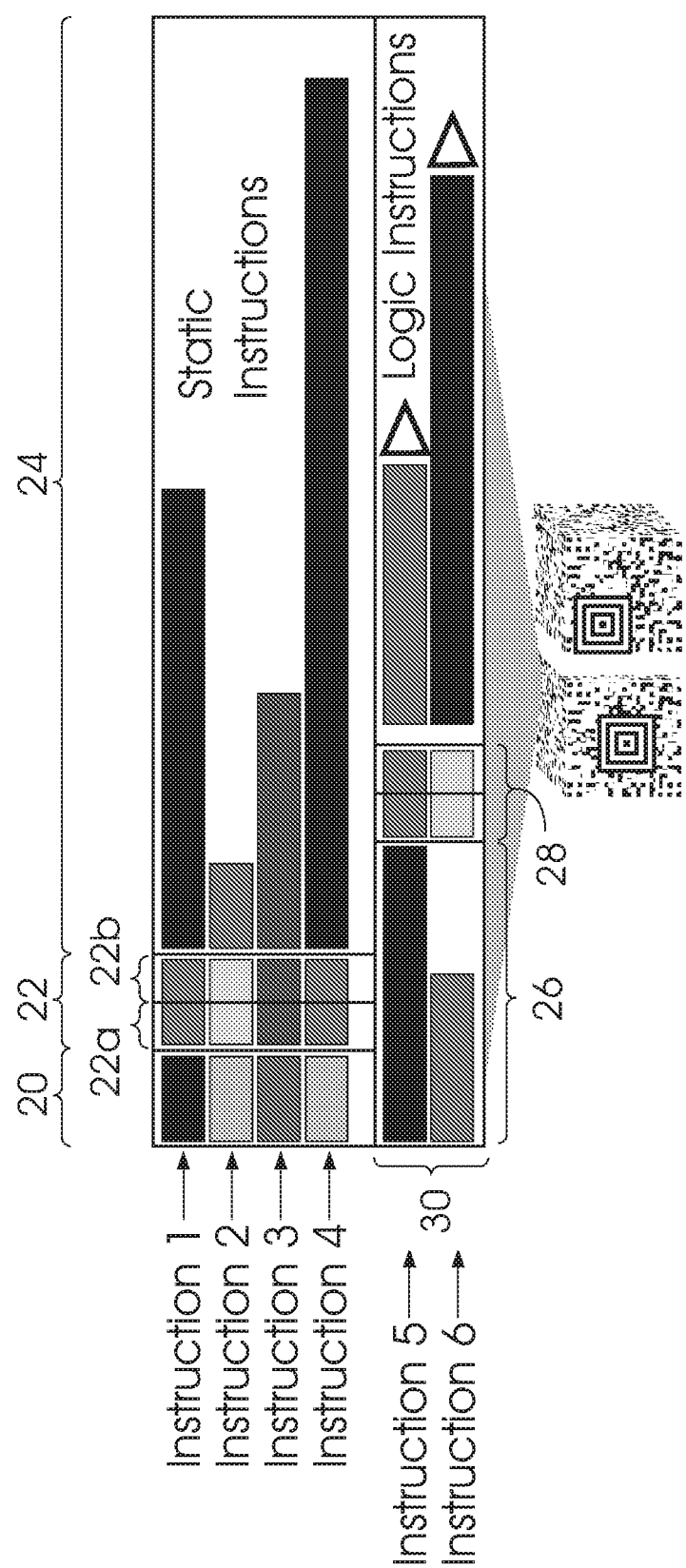
FIG. 2 shows a CPU and ROM data structure within an optical symbol which is applied to an article in accordance with the invention.

Reference is now specifically made to FIG. 2, which illustrates the CPU and ROM data structure within the optical symbol 52.

Processors (e.g. central processing units) and memory of the electronic world have structures in order to accommodate instructions and memory that is accessible to software applications. The structure must be known by these applications so that they may interpret them and make use of them for logical solutions. A particular and suitable structure is vital for the use of the optical symbols 52 in the present invention, in order to ensure that "related" software applications 54 can read and execute each instruction within the optical symbols 52, by using the ROM data.

The structure incorporates the following structural elements:

1. An instruction.
2. A directive/indicator as to how to read the subsequent ROM data and what type of data is in the ROM data.
3. The ROM data which follows each instruction and directive and which is relevant to each particular instruction.

The instructions are indicated by reference numeral 20. These instructions 20 are always of the same data size, except in certain cases indicated by reference numeral 30. This part will be discussed in more detail below.

As mentioned, the instructions 20 are carried out by applications on the ROM data (indicated by reference numeral 24) that follows the instructions 20 and directive/indicator (indicated by reference numeral 22).

The directive/indicator 22 relates to the ROM data 24 that follows it. It indicates what type of data it is and how long it is. As with the instructions 20, the directives/indicators 22 are the same size. More specifically, each directive/indicator 22 has its own two-part sub-structure, wherein reference numeral 22a refers to the data type of the ROM data 24 and reference numeral 22b refers to the length of the particular data type.

The ROM data 24 may typically be of any data type and any length. The data type and length are revealed in the directive/indicator 22. The ROM data is therefore not a "blob" of data, but structured according to each of the instructions 20 that has bearing on it.

Reference numeral 30 refers to certain complex instructions (see Instructions 5 and 6) which consists of two or more instructions that are concatenated. This enables an elementary form of logic which can be equated to firmware of electronic hardware.

The structure of the CPU 20, 22 and ROM data 24 presents distinct differences to that of a conventional electronic logic central processing unit and memory. The structure for the CPU 20, 22 and ROM data 24 is formulated in order to create functional scenarios for encounters between articles 50 and "related" software applications 54. These encounters will typically happen at a location at which the article 50 resides.

All that is required from the article 50 by the "related" software application 54 is what the application must do with each set of ROM data 24. Once the application 54 possesses this in an electronic form (which occurred by acquiring the optical symbol 52 and decoding it into electronic data), it interprets these instructions 20 and uses the ROM data 24 pertaining to each of these to carry out any number of different application functions in accordance with such.

The creation of the instructions 20 and directives/indicators 22 (i.e. CPU 20, 22), as well as the ROM data 24, is done by utilising a so-called Embedded Directive Markup Language (EDML). This term is unique and named within the context of this invention. The EDML is not a computer language in a true sense of the word. It can be vaguely compared to that of computer script languages. It does have not have a role in the area of computer software and is specific and unique for the purposes mentioned in respect of this invention.

The interpretation and execution of the instructions 20, directives/indicators 22 and ROM data 24 subsets are also done by utilising the EDML.

As mentioned, EDML is not a computer software language and only possesses a few similarities. It is a script of instructions and ROM data 24 that is developed by the "creator" (and/or other development institutions requested to do so) and is in line with the interaction with the anticipated "related" software application 54 (e.g. downloaded by other parties). The "creator" may delegate this development to other institutions with the required authorization, enablement and knowledge to carry this out. The same "EDML" is used for the four phases of interaction in the life cycle of the optical symbols 52:

Phase 1

The beginning or spawning of the optical symbols 52 takes place through the use of the creator software 12 (e.g. used by the creator). The creator software 12 makes use of embedded EDML instructions. The method of how the EDML instructions are embedded is not prescriptive and may be carried out in a number of methods (such as reference to a database or tables of the EDML instruction set). The creator software possesses the entire set of EDML instructions and is configured to choose those instructions that are required for a particular optical symbol 52 and then create an interactive "thing set" template of EDML instructions in accordance with the "related" software application 54 functionality that the "creator" desires.

This template is then used to populate or markup each article 50 that is part of a particular "thing set". This markup process is the core function of this phase. More simply stated, each article 50 of a "thing set" receives the same "EDML" instructions and directives (i.e. the CPU 20, 24) that are common to the "thing set", but is marked up with individual ROM data 24 that is relevant to the "EDML" instructions. Once this has been completed, each article possesses a CPU of common "thing set" instructions 20 (and directives 22) with unique ROM data 24. During this process, the "EDML" instructions 20 and directives 22, and ROM data 24 are incorporated or written into article data files.

The article data files are then encoded into digital data images that create the optical symbol 52, which is then printed on/applied to each article 50. A vast range of printing techniques and other techniques, such as laser engraving and dot peening, may be used to apply the optical symbol 52 to the physical article 50.

In a broad sense, these optical symbols 52 are essentially labels or marks of many different types that cater for a large range of articles 50. Once marked, these articles 50 become the bearers of their own data that is essentially intelligent, when interpreted by "related" software applications 54 (e.g. in the form of mobile apps).

Phase 2

This phase consists of each article 50 of a particular "thing set"", traveling globally with their embedded "EDML" instructions 20 and directives 22, and ROM data 24. The "related" software applications 54 and the actual articles 50 can essentially encounter one another at various locations and at any point in time. For example, an article 50 may travel from a manufacturing facility in South Africa to a company in England, where someone captures the optical symbol 52 embedded in the article 50, by using his smart phone 55 on which the "related" software application 54 is stored.

During these encounters the "EDML" instructions 20 and directives 22, and ROM data 24 essentially evolve from being "symbolic" in the "physical world of things" to electronic within the "virtual world". In other words, it changes from an optical symbol with embedded "EDML" instructions 20 and directives 22, and ROM data 24 into an electronic, portable data packet (PDP), which includes "EDML" instructions 20 and directives 22 and ROM data 24.

Phase 3

In this phase, the "related" software application 54 is configured/equipped to interpret the "EDML" instructions 20 for each subsequent ROM data set 24. The "related" software application 54 can now carry out numerous functional logic tasks in accordance with these instructions. These "related" software applications 54 may consist of software functions confined to the smart device 56 on which it is installed or it may function in conjunction with other connected software platforms, systems, applications and/or databases. This connection may typically be via a network, such as the Internet 60.

Phase 4

The portable data packet (PDP) acquired by the "related" software application 54 may be passed on in its original form to connected platforms, systems and/or applications, and may travel within large networks, such as the internet 60. Once the PDP resides within the "virtual world", it travels and encounters applications 54 as it did in the "physical world of things".

EXAMPLE

This example aims to demonstrate effective EDML instructions 20 and directives 22 and serves to demonstrate the fundamentals and considerations if a company were to formulate their own EDML instructions 20 and directives 22. The EDML instructions 20 and directives 22 used in this example can create effective functionalities for encounters between articles 50 and "related" software applications 54, and has the attributes to serve as an effective standard within certain areas and even globally. However, there is always room for alteration or the creation of alternative EDML instructions 20 and directives 22. Some institutions (companies, departments and so forth) may desire modifying the EDML instructions 20 and directives 22 described above or creating their own which they consider more pertinent and effective in formulating article solutions within their own area. It should be borne in mind that the EDML instructions 20 and directives 22 should be suitable to serve as a discreet packet (i.e. a PDP) that can travel with the articles and represent them in the "virtual world", in a similar manner as in the "physical world of "things".

With the present invention, the EDML instructions 20 and directives 22 and ROM data 24 are embedded in the optical symbol 52, as well as in the PDP's which include the EDML instructions 20 and directives 22 and ROM data 24 in a structured form (within the "virtual/electronic world").

The example set out below aims to show that a large variety of different EDML instructions 20 and directives 22 and ROM data 24 can be embedded in various different articles 50. Similarly, a large variety of "related" software applications 54 can be developed, which can perform different functions/actions, depending on the instructions which are decoded/extracted from the optical symbols 52 embedded in the articles 50.

In this example, the "commands" are delimited formats that incorporate the instructions 20, directives/indicators 22 and size that pertains to the ROM data 24 that follows. Each command consists of 5 data bytes or characters with the following format:

<Instruction Character, Data Type Indicator, Amount of Data Type>ROM
<IDS>

The characters <and> are the beginning and end command delimiters.

I Instructions: The first encapsulated command character is the instruction character 20. This instruction character relates to the ROM data 24 that follows after the command. Table 1 below represent some example instructions 20.

D Indicators: The second encapsulated command character is the indicator character 22a. This indicator 22a informs what the data type of the ROM data 24 is. Some of the data types that can be used are set out in Table 2 below.

S amount of data type: The third encapsulated command element 22b indicates the amount of the data type D indicated above that is used in the ROM data 24.

TABLE 1

| | I Instructions | | |
|---|---|---|---|
| T: | ORG: Barcode, chip, realm type | D: | Name of database external |
| | | E: | Encrypted field indicator |
| N: | Link Number of package/sequence on header (H) | r: | Record of database external |
| | | -: | Data compression end |
| | | f: | Field of database external |
| Q: | Link number of package/sequence on serial number (S) | k: | Field external |
| | | B: | Name database internal |
| | | d: | Record internal |
| X: | Link number packages out of how many linked packages | x: | Field internal |
| | | A: | Co-op Application name |
| H: | Header identifier | a: | Co-op application type |
| S: | Serial number | p: | Private digital signature name |
| I: | Pointer to an external database lookup table | m: | Private Digital signature value |
| | | u: | Public Digital signature name |
| T: | Instruction table pointer | v: | Public digital signature riddle |
| L: | Label | c: | Variable table |
| O: | Open text | x: | Extended command beginning |
| Q: | Type of encryption | | |
| Z: | Pointer to encrypted data table | y: | Extended command end |
| | | w: | Web address |
| E: | Encrypted value . . . | @: | Email |
| P: | Instruction pointer to external instruction pointer table | ?: | Owner |
| | | %: | Creator |
| W: | Encrypted directive | [: | Concatenate directives - amount |
| J: | Numbered directive indicator | | |
| B: | Bool true/false | (: | Directives lookup |
| !: | End of program | !: | Location bounds |
| /_\ | begin - end field description and data | ": | Location area |
| | | \: | Directory |
| $: | delimited data table | | |
| *: | The language and version | | |
| C: | Data compression type | | |
| \|: | Data compression start | | |

TABLE 2

| | D Indicators |
|---|---|
| s: | String of specified character bytes(256) |
| c: | Unsigned char |
| b: | Byte one unsigned character (265) |
| i: | Unsigned integer - two bytes (65,535) Also can be unsigned short |
| l: | Unsigned long - four bytes (4,294,967,295) |
| v: | Unsigned long long -- eight bytes (18,446,744,073,709,551,615->) |
| m: | Signed char - --16 |
| n: | Signed int - --4753 |
| o: | Signed long - --2222183333 |
| p: | Signed long long - --44884488884 |
| u: | Signed char -12 |
| f: | Float int - 1132.44 |
| g: | Float long - 1884939.21134 |

TABLE 2-continued

D Indicators h: Float long long - 382991.2201
x: Signed int float - --1002.111
y: Signed long float - --299201920399.110229
w: Signed long float - --29992010183993019993001990.0019930

As an addition to the singular instructions (e.g. see FIG. 2, Instructions 1-4), more complex logic instructions can be formulated by logically concatenating singular instructions with an additional extended set of special instructions (e.g. see FIG. 2, Instructions 5&6). These instructions 26 have indicators for the beginning that indicate the beginning and end of the concatenated instructions 26, as well as indicators 28 for the type of concatenation. In this regard reference is again made to the instructions and directives described with reference to Tables 1 and 2.

These logical instructions are similar to that of some types of electronic device firmware. As opposed to the un-extended set of singular set of instructions 20, that instruct an encountering application what to do with the ROM data, these logical instructions 26 instruct applications what and logically how to make use of the ROM data 24. There are also complex instructions 26 that demarcate an area of instructions and ROM data 24 with a specific purpose. For example, the following block of instructions 26 and ROM data 24 are encrypted with a mentioned public key: An instruction informs that there are a set of instructions encapsulated within the instruction.

The instructions 20, 26 embedded in the optical symbol 52 enable many forms of data security schemes and encryption types to be implemented. All of the security methods are triangulated with (i) the "creator" of the optical symbol 52, (ii) the optical symbol 52 with the instructions 20 and directives 22 and ROM data 24, and (iii) the creator software 12 (e.g. mobile app) used by the creators to create the optical symbol 52, as the points of the encryption.

The "creator" typically creates the "related" software application 54 (which can be downloaded by others) and the optical symbols 52. The "related" software applications 54 require enablement information from the creator to interpret security instructions within the optical symbol 52 that the "creator" created. With both simple and complex logical instructions 20, 26 and interpretation enabled applications (i.e. the "related" software applications 54), a close to endless amount of different types of data security is available. The simple instructions 20 and the more complex logical instructions 26, as well as combinations of both, help to provide stringent data security.

Figure 3:
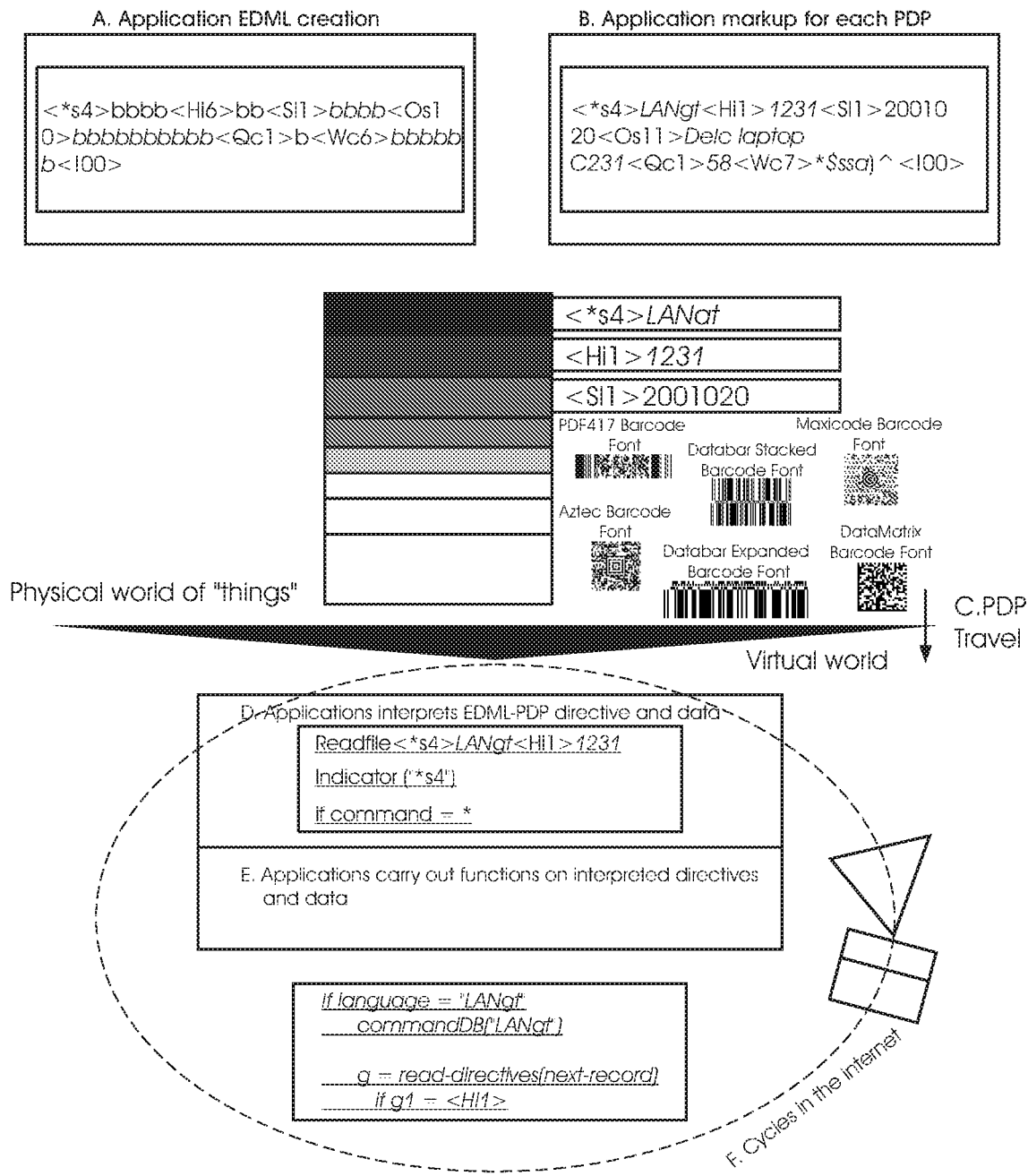
FIG. 3 shows a layout of a typical life cycle of a portable data packet (PDP)

The diagram illustrated in FIG. 3 illustrates a typical life cycle of a portable data packet (PDP) (as described earlier in the specification). This PDP essentially begins by being encoded in an optical symbol 52 which is applied to an article 50. The PDP therefore travels with the article 50 to wherever the article is transported to (e.g. the USA, Australia, Europe, etc.). The moment when the optical symbol 52 is captured/scanned (wherever the article 50 may be) and subsequently analysed by a "related" software application 54, the PDP essentially enters the digital world/"virtual world". The PDP can then be sent throughout various networks (e.g. the Internet 60) to many different nodes, systems and/or computing devices.

Point a in FIG. 3: Applications to Create EDML Template

This is the first phase in which EDML instruction templates are created for "thing sets". Applications software is developed using embedded EDML instructions. Typically, software 12 embeds the entire set of EDML instructions 20 and directives 22 and makes use of a combination of these that cater for the particular requirements of different "thing sets". A single software application 12 can be developed for the creation of many different "thing sets" with a large array of EDML instruction combinations.

Point B in FIG. 3: ROM Data Markup for Each Instruction in a PDP

The template created in point A consists of EDML instructions 20, 26 and directives 22, 28 and variable (markup) data fields of ROM data 24, in accordance with the directive combination for each "thing set". This template is then utilized to create any number of PDP's for articles 50 which form part of a particular "thing set", wherein each PDP incorporates the EDML instructions 20, 26 and directives 22, 28, as well as ROM data 24 which vary from article to article. These structured PDP's are then embedded into optical symbols 52, which are subsequently applied (e.g. printed or engraved) to various articles 50 within the "thing set". The life cycle of an article 50 of a particular "thing set" can then travel endlessly within the "physical world of "things"" and "virtual worlds".

Point C in FIG. 3: PDP Travel

The "things" "PDP-EDMLs" that are external or exogeneous to connected networks possess their own networks according to their dynamic geographical positions, which can be accessed from any location via these networks. After an optical symbol 52 has been applied to a particular article 50, the PDP embedded therein effectively travels physically with the article 50. The moment when the optical symbol 52 is captured (e.g. by a smart phone camera) and analysed by a "related" software application 54 (e.g. a mobile app installed on the smart phone 56), the PDP enters the "virtual world" and can be sent throughout various connected networks 60.

It should be noted that, in a slight variation, the PDP may be embedded within an electronic unit/device/chip, which is incorporated in/secured to, the article 50. In one example, the chip may be an RFID chip. In another example, the electronic unit may be near-field-communication (NFC) unit. In these cases, the PDP can be communicated to computing devices (e.g. smart phones 56) using RFID or NFC communication. Other forms of wireless communication could also be used.

By encoding an article 50 with a PDP (as described above), it essentially transforms the article 50 into a type of "smart article". The wording "smart article" used further below, refers to an article 50 with an embedded PDP.

Point D in FIG. 3: Applications Interprets PDP-EDML Directive and Data

This is the stage when a pre-created (programmed) application (i.e. the so-called "related" software application 54) encounters and acquires a PDP from an article 50 which incorporates the PDP (e.g. within an optical symbol 52 applied thereto). The "related" software application 54 is configured to read and interpret certain directives contained within the PDP and subsequently establishes if the PDP (a) has relevance to it, (b) is meant to be used by it, and (c) authorized to use it and has been equipped with various required data aspects. In many cases certain parts of PDP apply to different and varied applications 54. In other words, a PDP may mean different things to different applications 54 and these applications 54 will interact and carry out functions in different manners, functions and processes.

Point E in FIG. 3: Applications Carry Out Functions on Interpreted PDP's

Once the EDML instructions 20, 26 and directives 22, 28 contained within a PDP have been interpreted, a number of "related" software applications 54 can execute the instructions, depending on how many instructions the acquired PDP contained and how many are applicable to the particular "related" software application 54.

Point F in FIG. 3: PDP's can Enter the "Virtual World" Through Encounters Between "Related" Software Applications and Articles The PDP's which are acquired by "related" software applications 54 can be communicated into the "virtual world" during the carrying out of application functions or a direct pass on by the applications (i.e. via one or more networks, such as the Internet).

Figure 4:
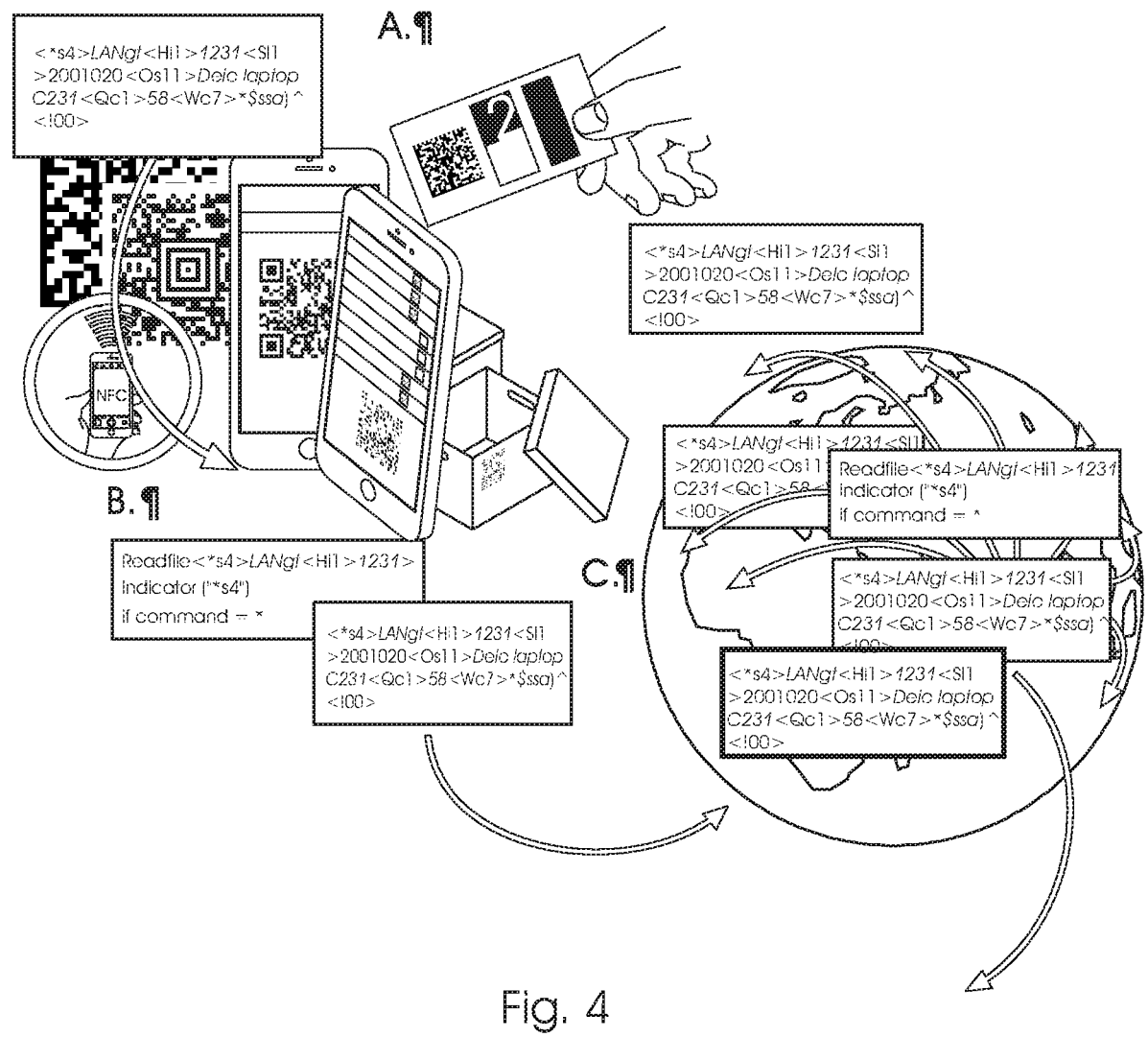
FIG. 4 shows a holistic global view of articles which are encoded with PDP's.

Reference is now specifically made to the diagram in FIG. 4, which provides a holistic global view of articles 50 which are encoded with PDP's. The diagram illustrates the parallel "virtual world" and "physical world of things", and how these can interact using the articles 50 and their encoded PDP's. Point A in FIG. 4 depicts the beginning of a smart article through the creation of a set of instructions 20, 26 and directives 22, 28, as well as ROM data, which then forms the PDP which is converted into/embedded in an optical symbol. The optical symbol is then applied to the article. Point B in FIG. 4 depicts where a "related" software application 54 installed on a smart device 56 acquires the optical symbol 52 in order to obtain the PDP contained/encoded thereon. At this stage, the PDP enters the "virtual" world and can be used to carry out functions by many "related" software applications 54. These "related" software applications 54 make use of the instructions 20, 26 and directives 22, 28 and ROM data 24 to carry out functions in communication with connected internet applications. The PDP's can also be communicated to many connected Internet applications and can perpetually travel within this virtual space, continuously interacting with "virtual world" applications (see Point C in FIG. 4).

Figure 5:
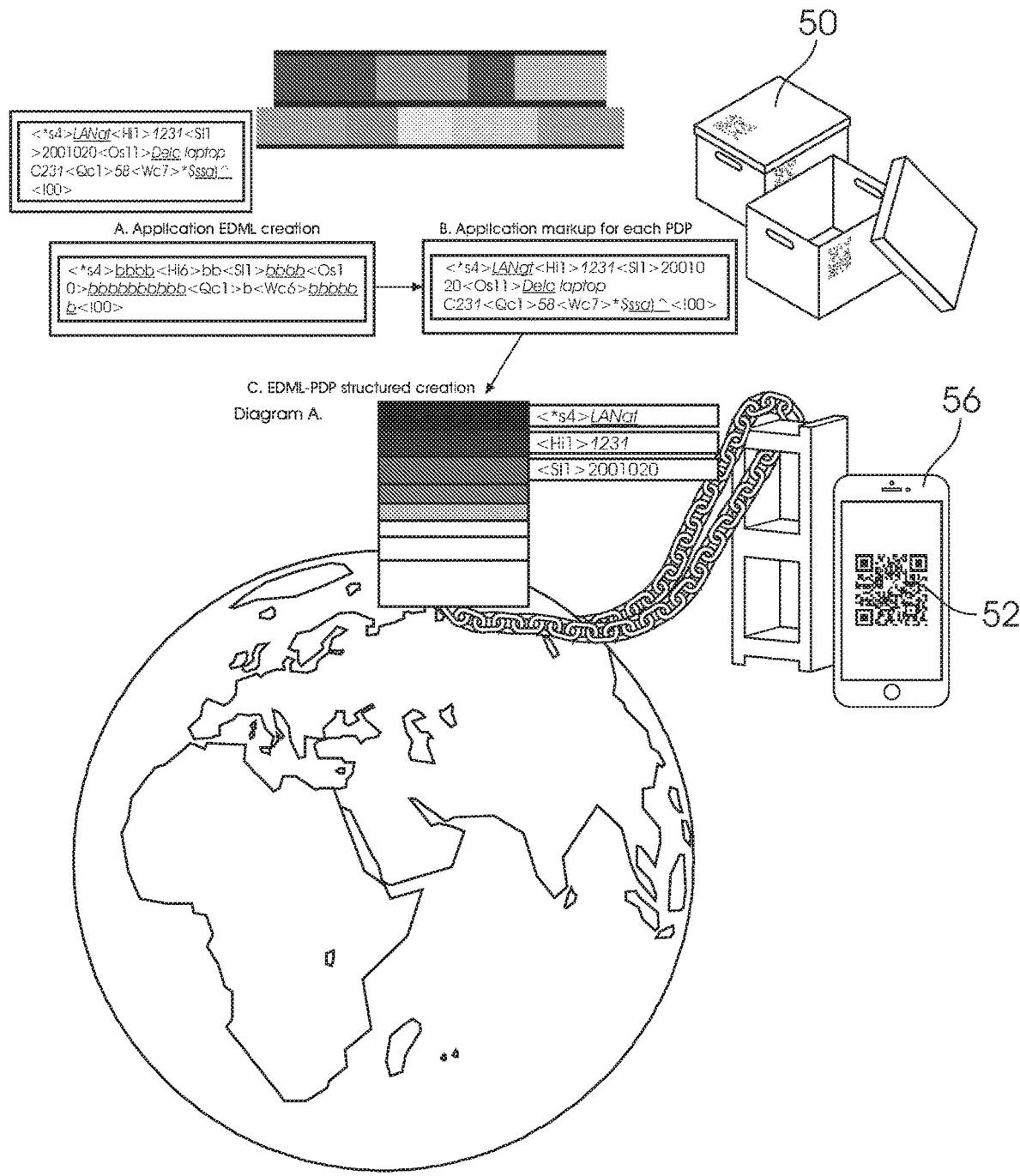
FIG. 5 shows typical block chain interactions between the "physical world of things" and "virtual world of things"

The diagram illustrated in FIG. 5 represents typical block chain interactions between the "physical world of things" and "virtual world of things". The latter depicting the main components of a global network/Internet 60 that is essentially an "the internet of all" where smart articles 50 can essentially interact and form part of the network/Internet through the use of their embedded PDP's.

Figure 6:
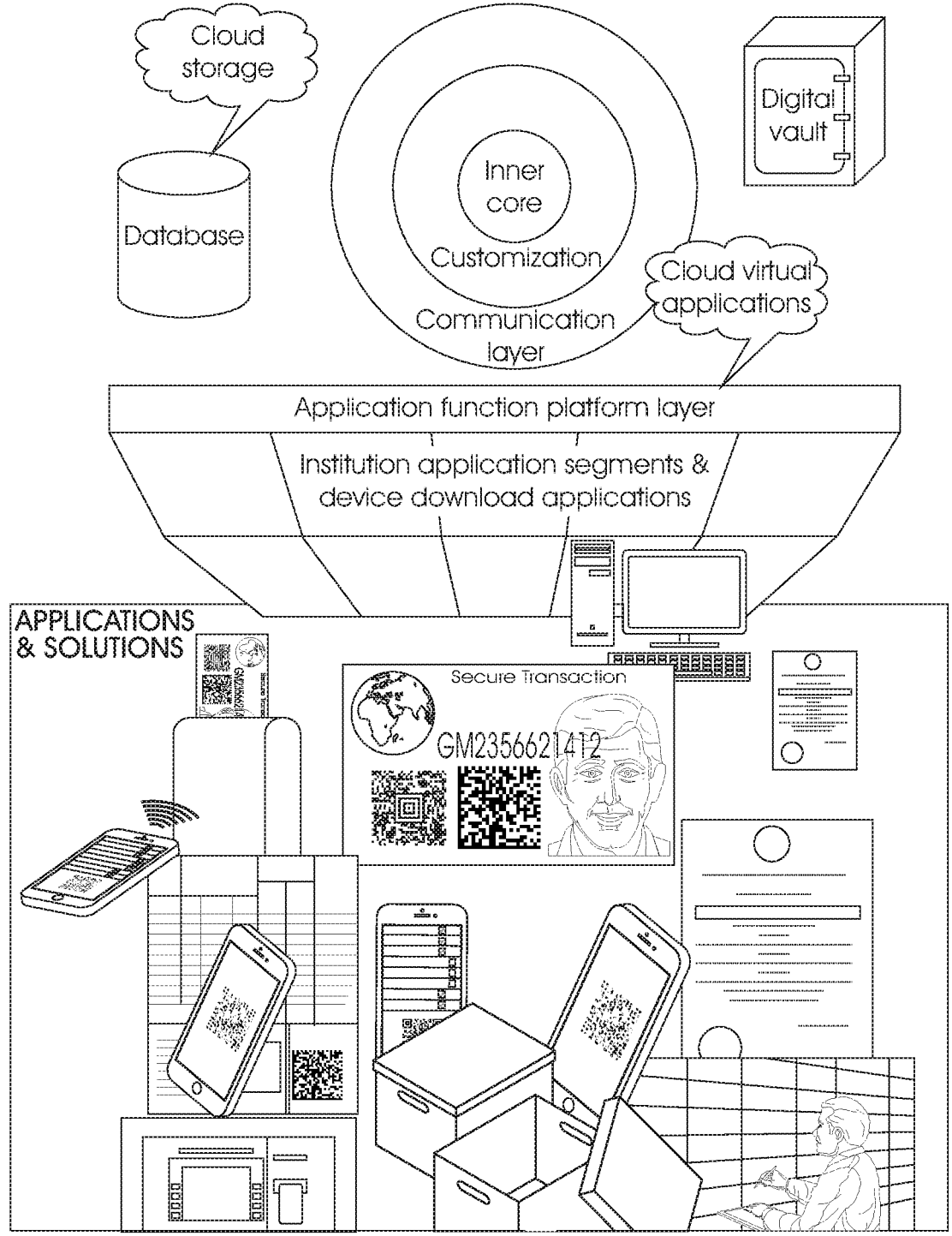
FIG. 6 shows a typical holistic view of the invention with an interaction within the virtual and physical areas.

FIG. 6 shows a typical holistic view of the invention with an interaction within the virtual and physical areas. The interaction is cyclic with internet platforms for creation of the digital optical symbols with instructions, directives, and ROM data, the downloaded symbol capture devices with interpretations of the instructions and functional actions on these. The typical symbol marked articles are also depicted.

The EDML instructions 20, 26 and directives 22, 28 are now described with reference to a few examples. In this regard, reference is also made to Table 1 above.

T:ORG: Indicates the type of package barcode, chip, network, block chain package and a massive amount of options currently available, as well as others which may be available in future.
Example: <Tb3> or <Ts5> or <TRO> or Int> or any type of package pre-determined name: two-dimension barcode (no data type indication required) as this is a special case format The following three directives 22, 28 are used when packages must be used in a logical sequence or with methods of collective indicator instructions of section on advanced indicators logical usage:
1. N: When the sequence of the package is according to the header H of the package.
   Example: <Nb1>9 The sequence of the package based on the header of the package is 9.
2. Q: When the sequence of the package is according to the serial number S.
3. X: How many linked packages are either 1 or 2 above (which ever one is used) (i.e. either N or Q)
   Example: <Nb1>5<Xb1>10<... The sequence number of the package is 5 out of 10 packages and is based on the header.
H is the header identifier that is usually in a string that describes the package or company or any other description required. It can also be expressed other than in a string, such as an integer which will require an application lookup table or database to acquire the header.
   Example: <Hs11>3Dbarcode<...
S is the serial number of the barcode and is usually expressed as a II (long long) to represent a massive amount of possible serial numbers for a particular PDP type or set.
   Example: <SI1>88448399<...
I is a pointer to an external named application lookup table or database. The reference to the table of an application by name in a string or by a small to very large number. One application may contain many reference tables for either one type or same sets of PDP or many types.
   Example <Is10>C:\mylook\table1<...
M is an instructor pointer to an application or table/database of instructions. There may be a number of databases.
   Example: <Ni1>212
L indicates a PDP label and is usually used for PDP encoded in two or three-dimension barcodes or other digital symbology labels. This indicator data set will be used for such a label. This is normally used when PDP data consists of a label only. This is the most simplistic use of EDML as it is only for a single function. It can however be used in combination with other indicators with collective indicator instructions to represent many labels in a PDP set. The reason that it is distinct from the below mentioned open text is that an application often needs to know whether it is of label type due to label real estate size considerations.
   Example <Ls10>Hello John<...
O is used for open text. Collective indicator instructions enable binary forms and encrypted forms that the recipient application can interpret into a text form.
   Example: <0s20>Good day how are you<...
t refers to a line number indicator and is almost exclusively used with collective indicator instructions. It can apply to many other indicators such as a line related to a label, a line related to open text, a line to an indicator within the PDP or another PDP, a line in another PDP application database, a line in an application program and many other options. This is significantly useful for collective indicator instructions.
   Example: <tb1>23<...
g refers to a position number almost exclusively used with collective indicator instructions. It can be an indicator of a position within any indicator selected data, such as data internal to a PDP, an external PDP and in positions tables and databases of applications.

Example: <gl1>66366887

W indicates a type of encryption that an application interprets in accordance to a subsequent data set. It can be interpreted by an application in several methods. One is that of an indicated encryption remains until another type of encryption indicator is encountered. This indicator is important when used as an indicator as part of a collective indicator instruction.

Example: <Wi1>651< . . .

J refers to named directive indicators that point to a recipient application directive named string, directive database or table. The directive indicator may also be a logic subset of the recipient application. This works well with a collective indicator instruction.

Example: <JI1>3001< . . .

! end of EDML indicates the end of an EDML so that an application is notified that it is at the end of a particular EDML script. This is of significance when more than one EDML script is used within a PDP.

Database indicators: This is a command script fragment specifically created for the writing of data into a field of a named database of the recipient application.

M a database name.

R a database record. A special script indicator #to indicate the start and end of a record.

F a database field. A special script indicator * to indicate the beginning and end of the field. A number of fields can be updated for one database name and record indicator.

EXAMPLE

<Ms5>gavin/Rs6/
gavint*fs4*name*vs6*randall*vs2*ID*vb1*554#

I refers to the language and version that is used in the EDML. This should normally be the FIRST directive. More than one EDML and version can be used in a single PDP. Once a different language directive has been encountered, the rest of the EDML will be interpreted with this. This therefore enables multiple languages within a PDP or across linked PDPs.

C refers to the compression type used. This type will be assumed until the next compression directive is encountered.

Example: <Cs7>arithn1< . . .

L refers to compressed data set. The data set following the directive is compressed according to the last compression directive encountered.

Example: <Lb10>*%TyF):q21< . . .

B indicates compression across a section of the EDML script that incudes directives within the compression data.

Example: <Bb20>gj8&%hByADhdb&h*% wo< . . . (includes < >directives in the compressed data).

U refers to encryption type. Once indicated, this type will remain until a new encryption type is encountered. A single PDP or linked PDPs may have many different encryption types.

Example: <Ui1 >17748

E: Encrypted for the data set that the directive pertains to in accordance with current directive the current directive encryption type.

Example: <Ei8>27739991882919212118882 9182< . . .

Note: Byte or char values are obtained from each integer using write masts. This applies to all data sets when byte or char values are required out of binaries, such as integers, doubles and so on. In this example, char values are first obtained by write masts and then decryption takes place according to the current type.

e refers to encryption across a section of the EDML in accordance with the current encryption type. This will include directives and data sets. The directive data of this set must be decrypted prior to the directives within been able to be carried out.

Example: <es10>YS&%7 k refers to an unnamed field indicator which only indicates that the dataset pertaining to the directive is that of a field type and is used as a field in one or various databases, depending on the co-operative logic between the EDML and application. It is often used with collective indicator instructions.

Example: <kv2>6577494938400029393 93993848< . . .

v indicates that the dataset varies per PDP of a particular PDP-EDML set (a set of PDP-EDMLs created with an EDML creation template).

Example: <vv3>4739992292003920039920 02 7787870099887634< . . .

k indicates that the dataset is constant per PDP of a particular PDP-EDML set (a set of PDP-EDMLs created with a EDML creation template).

Example: <ki3>88e98889908< . . .

B points to a data base in the application that is the recipient of PDP-EDML. This usually used to ensure that a recipient application does have such a database, as it may be relevant for the PDP-EDML and the recipient application. Note: This can be used to ensure a number data basis'

Examples:
<Bs7>DSD-247< . . . or it can be delimited for several databases
<Bs13>Lt01; Lt05; Bt3< . . . Note: Delimited characters are often used to name more that one in a data set for other directives.

A relates to co-operation application names. The names of applications that may be co-operate with the PDP-EDML. Note: The same applies as in the directive B, several can be mentioned with delimiters.

Examples:

<As7>DSD-247 <.......
<Ac13>Lt01;Lt05;Bt3<......

a refers to the type of the co-operation application name/s. It may be relevant to state what the type of mentioned co-operation applications should be. This is a further qualification to that of directive A. This may be anything, such as a smart device application, or a smart device with finger verification. The type will remain until another one is encountered.

Example: <as12>Sfv;pltmsnap< . . .

j refers to an application private signature name that is to be used for (PKI) actions within the recipient application until a new directive is encountered.

Example: <jc5>prsa1

K refers to an application public signature name that is to be used for (PKI) actions within the recipient application until a new directive is encountered.

Example: <ks5>pbsa1 p refers to a private digital signature name in the EDML. The application can verify existence by searching for a particular private digital signature name within the EDML. The name remains until another is encountered, so that each subsequent EDML private signature number will be equated or re-equated to this name.
Example: <pc5>ps001< . . .
i refers to a Private Digital signature value or number in accordance with the last private digital signature name encountered.
Example <:i3>238822331231
U refers to a public digital signature name in the EDML. The application can verify existence by searching for a particular public digital signature name within the EDML. The name remains until another is encountered, so that each subsequent EDML private signature number will be equated or re-equated to this name.
Example: <Uc5>Us001< . . .
V refers to a public digital signature value or number in accordance with the last private digital signature name encountered.
Example: <Vb8>200199399121< . . .
} refers to a digital signature riddle number or value. This triggers a PKI riddle secure transaction method. This is a unique manner to secure transactions and the data pertaining to the transaction.
Example: <}16>48849994000294949492 77738882< . . .
v refers so a pointer to a application variable data table. Applications require to have been supplied with such a table by the creator.
Example: <vs10>ttable2311< . . .
w refers to a web address. Web addresses that may differ per PDP of a PDP set or type.
Example: <Ws13>Snaptings.com< . . .
@ refers to an email address as in directive W may differ per PDP of the PDP type.
Example:

---

<@b30>2881001001106162811281128817 <.....
<@s14>john@gmail.com<........

---

J refers to the name of the company, person or any sector of the global community who is the owner (administrator) of the PDP-EDML.
Example: <Js11>Eagle tools<JS10>star tools< . . . (Plural directive example)
+ refers to the creator or creators of the PDP-EDML.
Example: <+i3>199100019920< . . .
{ refers to a pointer to an application data table or database of directives
Example: <(s9>tel-kr32< . . .
! refers to a location area in which the PDP-EDML is valid
Example:
<!i3>188200182001466200288112<!i5> 19920199200199257< . . . (plural directive example)
"refers to a local area indictor. A named or coded location
Example: <"s15>texas< . . .
Z refers to an end of the EDML. Another EDML may follow in cases when a PDP-EDML possesses more than one EDML
Example: <Z . . . >
Collective Indicators
Collective indicators (referred to above) is a chain of concatenated directives in which each directive is reliant on the one before it. This is a more advanced use of EDML. These collective indicators provide more information to applications for advanced EDML (application logic and complex functional operations). This expands and empowers EDMLs extensively and enables many different applications (EDML functions and processes). The collective indicators do however require more complex EDML template creation considerations and creations.
This makes use of a G to indicate that the following are collective concatenated.
Example: <G1>4<Qs3>rtp<vi1>7748383<Eb6> 2910492<'s11>end colprg1
G indicates four sets of combined instructions follow. The first instruction is relevant to the second instruction and third instruction to the second instruction, or in other words each instruction is relevant to the proceeding instruction.
Language Data Indicators and Data Usage
It is a sequential language, that consists of a demarcated instruction, data type and amount of the data type indicator. The < > indicates the beginning and end of the indicator that contains an instruction, data type and data amount. The ROM data follows the end > indicator.

---

<Tb3>bbb<Ai2>bb<Hs4>bbbb<Sv1>bbbbbbbb<1b7>/bbbbbbb
<Rb4>bbbb<Fb9>bbbbbbbbb<Lb16>bbbbbbbbbbbbbbbb<Ob9>
bbbbbbbbb<Ei1>/bb<Sb3>AES<Ev1>bbbbbbbb

---

The above language or code fragment depicts the various ROM byte usage for different data indicators < > that contain an instruction, data type and data amount. It is clear from the above that string type ROM data are not at all optimum (actually ROM data guzzlers).
Some two-dimension barcodes do not support the use of binary data within the symbols (such as integer, long, floating point/decimal data types) and only characters and character strings can be used. The binary code, in these instances are expressed in hexadecimal, which increases the amount of data amounts that requires to be encoded into two-dimension barcodes, and therefore result in larger two-dimension barcodes of reducing the amount of error correction (which results in more vulnerable two-dimension barcodes). These also restrict and often negate certain functions such as compression and most types of encryption as these require different data types such as integer, long and float/decimal values. Fortunately, the two-dimension barcodes such as that of the QR code are now capable of incorporating binary code with certain encoding decoding manipulations or changes.
CPU instruction set code standards. The above detailed example of a CPU instruction set and the corresponding ROM to each of them, demonstrates one of endless types of CPU instruction sets. This is the same as that of electronic central processing units. However, it is often of considerable importance that standards are applied to the operability and therefore the instruction set of the type of CPU's. This importance is highlighted when a platform is developed that supports various different institutions (all forms of legal entities, such as companies, government entities, partnerships, hospitals, etc.) with various diverse types of items, such as products, documents, and cards. With a common standard CPU EDML instruction set companies, institutions and their items can be supported with a common standard instruction set which enables inter-polarity and interoperability between all the institutions and their items. In the example below, one can deduce that many instructions are pointers to data repositories of a developed cloud platform. As with the CPU EDML, the repositories across multiples of institutions and items is a matched recipient in accordance with the EDML. Table 3 below represents such a standard CPU EDML. This is a binary EDML that enables CPUs to make use of the standard numerical types that are promulgated in the standard C language and its derivatives such as C++ and C #.

TABLE 3

Standard EDML

| Data Types | Amount of bytes | Maximum number | Types of data supported |
|---|---|---|---|
| C Unsigned char | One byte/ character | Maximum number 256 | All Ascii binary characters |
| S unsigned char string | One character per alpha numeric and the rest of the ascii range charater | Maximum number 256 alpha numeric or ascii range | Use only alpha numeric, spaces and common punctuation |
| I Unsigned int | Two bytes/ character | Maximum number 65,535 | Binary |
| L Unsigned long int | Four byte/ character | Maximum number 4,294,967,295 | Binary |
| D Unsigned double long | Eight bytes | Maximum number 18,446,744,073,709,551,615 | Binary |

The table which extends accross FIGS. 9a to 9f indicates the different instructions, describes them and supplies examples of the usage of each. The instructions and the delimiter for each are in characters (the unsigned char complete Ascii set with extensions). The instruction delimiter begins with the character < which is followed by the instruction and the data type that is indicated in the table above. ROM data follows in accordance with the data type.

The PDP EDML Driven Physical/Virtual Transaction Blockchain

Masses of global transactions with portable devices and PDP CPU and ROM forms a type of block chain in the physical world. "Things" direct this blockchain with their EDML instructions. An intricate unpredictable blockchain is effectively created by multiples of "things" with different abilities to direct and instruct. Multiple relevant links between the different "things" form an intelligent naturally physical block chain as "things" impart with information that links them to other "things", as well as multiple areas of the virtual world. The block chain evolves in the physical world and the virtual world at the same time. The block chain can potentially grow perpetually with intricacy and knowledge with intelligent links between transactions, people carrying the transactions and institutions. The EDML of "things" along with other information related to it (such as location, person transaction, transaction time and so forth) enters the virtual block chain on each transaction as part of the block chain automated transaction ledger. The EDML in each transaction in the ledger reveals everything that the "things" directed during the transaction. When a particular ledger is accessed for such reveals, everything that happened during the transaction the multiple millions (or more) of interlinking with other institutions, products, people and so forth.

Figure 10:
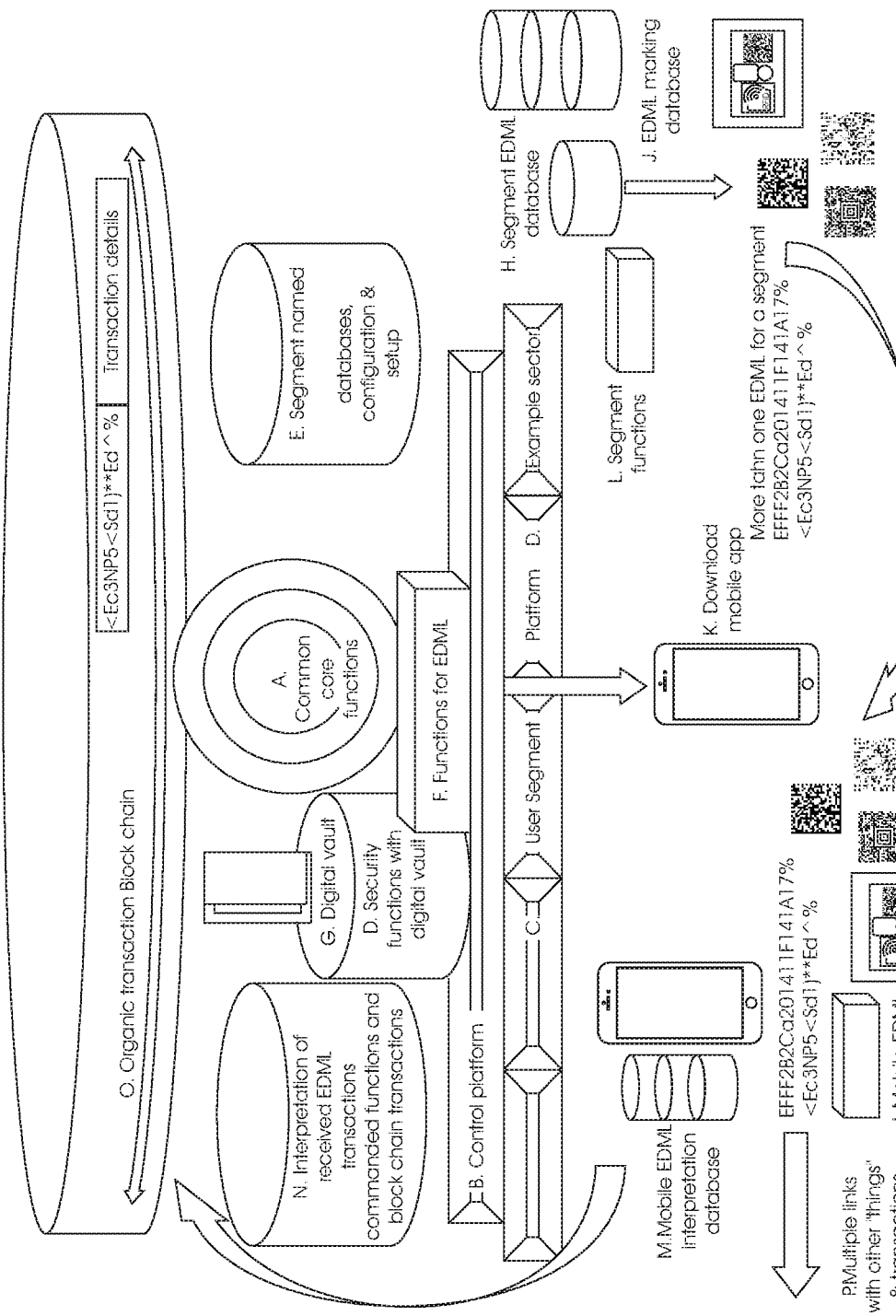
FIG. 10 shows a diagram which depicts a perpetual cycle of "things" with PDP EDML from creation to mobile device app transactions and the EDML retention on the block chain.

The diagram illustrated in FIG. 10 depicts a perpetual cycle of "things" with PDP EDML from the creation to the block chain within the virtual platform and that of the physical world. Once the PDP EDML "thing" has been "spawned", the cycle is essentially perpetual, as is for all "things" with PDP EDML.

The diagram depicts the components of the platform/system 10 in accordance with the invention that provides functionality for the perpetual life cycle of these PDP's, once they have been created by the platform/system 10. It should be noted that although the exact components illustrated in FIG. 10 may chance, the same functionality will be required.

Parts "A" to "P" illustrated in FIG. 10 will now be described in more detail:

A. The core functions are those that are common to many areas of the platform/system 10. An example of these are encryption, compression, optical symbol creations, database functional code and so forth.

B. This refers to a control platform. It is the communication hub of the platform/system 10, supplying instructions, directives, and data to the other components. In addition, it also triggers functions in the core (A) and supplies parameters to these and receives outputs from them.

C. The segmented platform is a platform that is divided into discreet segments that support the functionality for a particular purpose or utilization area. The functions and communications between the functional area and the other platform components take place via the control platform (B).

D. This is an example segment that describes the area of marking articles or products with structured optical symbols with embedded EDML. In this case the optical marks are created on different product materials with laser marking (such as fiber and UV—Ultra violet lasers).

E. This database contains the details of each platform segment.

F. This component contains the EDML specific functions. These create EDML according to platform segment requirements. The example described in (D) requires specific marking for the marking of items and therefore requires EDML instructions, directives and data. These are a logic EDML instructions, directives and ROM combination derived from the Table 1 or Table 3. These are in accordance with what functions a particular item or group of items are required.

G. The digital vault is the security master component. All data security functions, scenarios and schemes, as well as the peripherals for them (such as digital certificates, private/public keys, passwords and so forth) are carried out in the digital vault. The EDML is capable of many encryption and authentication (digital signature) schemes.

H. A segment EDML database. This is the database for the different articles that the segment supports.

I. The functions that are used to create the EDML for the different items or articles of a segment. The EDML database (H) is created and appended with the outcome of these functions. These functions can be referred to as the logic creators of EDML for a particular segment. This is the beginning of the intelligent symbol cycle.

J. This is a database that is populated with the EDML (instructions, directives and ROM) in each record for the marking of each article within a particular set of articles (a set can be a batch or article type). Most of the EDML instructions, directives and ROM data are the same, except for some of these that are specific to each article of the set. The data for the input of different marking devices (laser markers, label printers, etching and dot peening devices and many others) is derived from this populated database. The functions in (I)

format the data in the correct structure for the EDML data interface with the marking device. The article is marked and dispatched into the physical space (i.e. that outside of virtual space, in this case the platform/system 10). From this point the article travels in the physical world/space awaiting an encounter. It remains in a state of latent irrelevancy until an encounter or transaction/interaction with an application occurs. While not in a transaction/interaction process, the article possesses the potential for intelligent transactions/interactions.

K. This potential described in (J) changes to active when a transaction/interaction occurs with an application such as one of a smart device application. The applications for these smart devices are downloaded from a particular segment.

L. The mobile or smart device possesses functions that interact with the EDML of articles during a transaction/interaction. These functions interpret the EDML according to the directives and cary out the instructions with the ROM data.

M. Within the EDML there are instructions to send some (normally most) of the information to the virtual platform. This is usually in the form of EDML smart device to platform communication. These instructions, that are derived from the articles, are mostly sent to the interpreter database within the virtual platform. The transaction/interaction with a mobile/smart device enables the article's information or data to enter the virtual platform.

N. This is the EDML interpreter for data received from the applications during an article EDML/smart device transaction/interaction. This interprets the article's instructions as which actions must take place on the blockchain.

O. The block chain's dynamics is determined by the article EDML during EDML/smart device transactions/interactions. The article dictates the way the block chain represents transaction/interaction with different articles. The block chain is dynamic and "molded" by articles and therefor is a true representation of what was the intention for the block chain dynamics when the EDML article was created. The block chain and the links that are created by smart device/article EDML transactions/interactions are unpredictable and are only created when an article becomes relevant by a EDML/smart device transaction/interaction. The bock chain is referred to as organic as its formation and dynamics have its roots purely in the physical or natural world. In many cases, part of or the entire article EDML from an EDML/Smart device becomes a part of the transaction record of the block chain. The EDML within this record can be re-enacted at a future data in order to determine exactly what occurred during certain transaction. All of the instructions, directives and ROM data for a particular transaction will then be available in the future.

These are typically those explained in (Tables 1 and 2)

The present invention provides various significant advantages which cover a large area of application. A prime advantage is that, within the area/realm of the internet of things, the invention imparts a form of artificial intelligence to "things" (IoT) of the physical world. The current technological world is however still grappling with the concept of the IoT. The physical aspect of the Internet of things is one which is much debated, with no available comprehensive technology that enables almost the entire area with a single technology. It is the linternet of things and artificial intelligence that can serve as the main contributor to the fourth industrial revolution. The physical world of things is extremely extensive and complex and so too will the platforms that support the multiple complexities of the extensive requirements in the physical space. This global number of things is extensive, highly dynamic, unpredictable and the routes and links extraordinarily complex. The present invention provides a technology that allows virtual platforms to carry out all the functionality required which are related to physical articles/"thing". As apposed to attempts by technological developers to create virtual systems that reference the world of physical "things", this invention enables "things" to control the virtual platforms from the physical space, by constantly and accurately representing and recording transactions "as it occurs", and helps to reduce information and authentication security weakness. The enabling of intelligent marking, imparting a form of artificial intelligence to things and creating a blockchain, allows the present invention to reflect transaction events in close to real time and for future references. By using the present invention, a unique block chain can be created that grows in accordance to the complexity of the physical tracing and transaction reality in the physical world of things. Another distinct and significantly important advantage of the present invention is that the instructions, directives and ROM data can be altered at any time even when there is no contact with the article and its location is unknown. This instant change can be in reaction to any event, such as an article marked for recall, the highly unlikely event of a data security breach, article/public promotions that alter each day, changing advertisements, changing information and so forth. These can also be automated and activated by artificial intelligence and augmented intelligence in reaction to the block chain intelligent ledger.

The Inventors believe that the present invention can be very beneficial in track and trace, illicit item prevention, client indulgence with articles, essential article information, articles with huge amounts of information accessible from minute optical symbols on almost any article surface or material, article and document authentication (with post quantum encryption enabled by the EDML), endless links between articles (either in the form of products and goods, documents, secure cards or links between these types), and multiple function secure cards supporting a close to endless amount of diverse functions on each card (such as identity functions with or without biometrics, banking functions, healthcare, medical aid, drivers license and other licenses, passports, visas, entitlements and so forth). With regards to cards, for example, an optical symbol would be applied to the card, which then relates to specific instructions, directives and ROM data which are associated with the particular card (e.g. payment account information,). However, as an alternative to physical cards, the said optical symbol can be applied to bracelets, smart device covers, dog tags, wallets and virtually any type of article, which can then be a carrier of such a multiple function card (the functionality is the same and one can possess duplicate in many different physical forms).

The Inventors believe that the present invention provides an effective way of allowing articles 50, which would traditionally not be able to form part of the digital/virtual world (e.g. wooden chairs and tables), to into enter, and form part of, the digital/virtual world. This is done through the unique implementation of optical symbols 52 which are embedded with instructions 20, 26, directives 22, 28 and ROM data 24, 28 which are structured in a specific way in order to allow mobile applications 54 (as well as other software applications) to read and execute the instructions 20, 26, by utilising the ROM data 24, 28. The application of optical symbols 52 is also relatively inexpensive, which is an added benefit of the present invention.

By incorporating instructions 20, 26 and directives 22, 28, as well as ROM data 24, 28, into an optical symbol 52, an article 50 is essentially transformed into a type of smart/intelligent article, whereby software applications 54 can perform certain functions/operations in relation to the article 50.

The present invention allows the creators or custodians of articles 50 to have the power to express their will, directives and control in the IT processes that pertain to these articles 50 during their life cycle. "Relater" software applications 54 will be able to understand the meaning of the data or information and the scope of what can and should be carried out with it. The smart article 50 with its instructions 20, 26 and ROM data 24, 28 can retain its integrity and enter from the physical world into the virtual/digital world at all application-article encounters, as well as at various different locations. Once this (i.e. the PDP with the instructions 20, 26, directives 22, 28 and ROM data 24, 28) has entered the virtual world, the article 50 essentially retains its smartness and represents itself within it. The PDP remains available, within the virtual world, for any number of enabled applications 54 to interact with them in an almost endless different manners and purposes.

This invention also enables a radically new approach from that of the current security of articles 50. It provides an effective methodological shift from that of "the secure internet of things" to that of "the secure internet of secure things". The security of things/articles begins with the creators of the things/articles 50. The creators of the PDPs that are encoded into optical symbols determine security methods and schemes prior to the creation of both the PDPs and download applications. The security schemes, types, PKI encryption keys and other data that may be required are contained in the indicators and corresponding ROM data. An example is when an application is informed that indicated ROM data is encrypted with a particular type of encryption and requires one or two encryption keys for the decryption process. One or more indicators will inform the application that the ROM data or sets of ROM data that follows is encrypted with a certain type of encryption, that requires one or more encryption keys (may be that of a private or public encryption keys) to decrypt the ROM data. Almost endless types of encryption schemes and methods can be determined and used with variations of this example.

The CPU and ROM equipped smart optical symbols 52 provide authentication, verification and data security not only to internet applications involving themselves but as ancillary security instruments for multitudes of secure applications (such as secure bank transactions, identity-based applications). A key security advantage of optical symbols 52 is that the data is not electronic but optical, and cannot be tampered with in its symbolic form, i.e. it is unchangeable even when they are sharing their data with applications that are "on line" (i.e. their data remains securely unchangeable within the optical symbol). The security methodology of this invention includes the incorporation of security instructions within the optical symbol CPU. A security instruction informs an encountering application what the security nature is and what is to be carried out with the applicable secured ROM data. In simpler terms, it informs an enabled application what is required to decode or understand the data, and may or may not be prescriptive as what should be carried out with or what to do with the secured ROM data.

This invention provides a solution to the barrier of creating a "true internet of things" in which the "thing" (i.e. the article 50) itself is the core subject and controller of its place in this Internet 60. It imparts a secure life cycle of application as they persistently move between the physical world and the virtual internet when encounters occur between smart optically marked things/articles 50 and applications 54 (mostly smart device applications). During the encounter of the optically marked smart "things" 50 and applications 54, a convergence of functionality takes place between the applications 54 and the optically marked smart "things" 50.

The applications 54 acquire the CPU instructions 20, 26 and ROM data 24, 28 from the smart optical symbol and makes use of the instructions to carry out any amount of software applications that were created with an understanding of what the instructions means. The use of the instructions are computer language, operating system and platform independent. The dramatic increase of data that can be incorporated into symbols when making use of the emerging three-dimension barcodes, enables an extensive amount instruction, pertinent instruction structured ROM data and even complex instructions with complex logic.

The invention claimed is:

1. An article which includes an optical symbol which can be scanned/captured by an image capturing device, wherein the optical symbol incorporates, or is encoded with, a set of instructions which are readable and executable by a computing device/processor, wherein each instruction of the set of instructions has (i) at least one associated directive/indicator and (ii) associated read-only memory (ROM) which are also incorporated or encoded into the optical symbol, wherein each directive/indicator is structured/configured to indicate to a computing device/processor how to read the associated ROM; and wherein each instruction is directed to its associated ROM and is configured such that, when the instruction is executed by a computing device/processor, its associated ROM is utilized in executing the instruction, and whereby the associated directive/indicator is used by the computing device/processor in order to indicate to the computing device/processor how the associated ROM should be read, in order to allow the instruction to be executed.

2. The article of claim 1, wherein each directive/indicator is structured/configured to indicate a ROM type and/or size of the associated ROM to which the particular instruction is directed, in order to indicate to a computing device/processor how to read the associated ROM, so that the associated instruction can be executed by the device/processor.

3. The article of claim 1, wherein each instruction of the set of instructions has:

an associated indicator which is incorporated or encoded into the optical symbol and which indicates a data size of the associated ROM to which the particular instruction is directed; and an associated directive which is incorporated or encoded into the optical symbol and which indicates a data type of the associated ROM to which the particular instruction is directed, wherein, when an instruction from the set of instructions is executed by a computing device/processor, the associated directive and associated indicator are used by the computing device/processor in order to indicate to the computing device/processor how the associated ROM should be read, in order to allow the instruction to be executed.

4. The article of claim 3, wherein each instruction of the set of instructions has two associated types of indicators which are incorporated or encoded into the optical symbol, wherein a first indicator type indicates
- a beginning of a command, whereby the command incorporates the instruction and its associated directive, and an end of the command,
- while a second indicator type indicates how many of a particular data type to read after the end of the command indicated by the first type of indicator.

5. The article of claim 3, wherein the optical symbol incorporates, or is encoded with, a script which incorporates the set of instructions, indicators, directives and ROM.

6. The article of claim 5, wherein the optical symbol incorporates, or is encoded with, complex instructions which comprises of two or more instructions which are concatenated, wherein a first instruction of the two or more concatenated instructions are relevant to a second instruction of the two or more concatenated instructions.

7. The article of claim 5, wherein the article is a physical article, object or product.

8. A method of marking an article, wherein the method includes:
- encoding at least a set of instructions into an optical symbol, wherein for each instruction of the set of instructions at least one associated directive/indicator and associated ROM are also encoded into the optical symbol, wherein:
  - each instruction is readable and executable by a computing device/processor,
  - the ROM is associated with the optical symbol,
  - each directive/indicator is structured/configured to indicate to a computing device/processor how to read the associated ROM, and
  - each instruction is directed to its associated ROM and is configured such that, when the instruction is executed by a computing device/processor, its associated ROM is utilized in executing the instruction, whereby the associated directive/indicator is used by the computing device/processor in order to indicate to the computing device/processor how the associated ROM should be read, in order to allow the instruction to be executed; and
- marking the article with the optical symbol such that an image capturing device can capture an image of the optical symbol.

9. The method of claim 8, wherein the encoding step includes utilising a processor in order to encode each instruction, its associated directive/indicator and associated ROM into the optical symbol.

10. The method of claim 9, which includes structuring the set of instructions, directives/indicators and ROM into an electronic/portable data packet.

11. The method of claim 8, which includes structuring/configuring each directive/indicator to indicate a data type and/or size of the associated ROM to which the associated instruction is directed, in order to indicate to a computing device/processor how to read the associated ROM, so that the associated instruction can be executed by the device/processor.

12. The method of claim 11, wherein the method includes, for each instruction of the set of instructions:
- incorporating or encoding an associated indicator into the optical symbol which indicates a data size of the associated ROM to which the particular instruction is directed; and
- incorporating or encoding an associated directive into the optical symbol which indicates a data type of the associated ROM to which the particular instruction is directed,
- wherein, when an instruction of the set of instructions is executed by a computing device/processor, the associated directive and associated indicator are used by the computing device/processor in order to indicate to the computing device/processor how the associated ROM should be read, in order to allow the instruction to be executed.

13. The method of claim 12, wherein the method includes incorporating the set of instructions, indicators, directives and ROM into a script and incorporating or encoding the script into the optical symbol.

14. The method of claim 12, which includes incorporating or encoding complex instructions into the optical symbol, which comprises concatenated strings with logic operations which can be executed by a processor/device.

15. The method of claim 12, wherein
- the set of instructions are readable and executable by means of a software application which is executable by a computing device/processor.

16. A system for performing one or more functions/operations which is related to an article on which an optical symbol is provided, wherein the system includes:
- a receiving module which is configured to receive an image of the optical symbol, in digital form, wherein the image is encoded with:
  - a set of instructions which are readable and executable by a computing device/processor, wherein each instruction of the set of instructions has (i) at least one associated directive/indicator and (ii) associated ROM which are also encoded into the optical symbol,
  - wherein the ROM is associated with the optical symbol;
  - wherein each directive/indicator is structured/configured to indicate to an execution module how to read the associated ROM; and
  - wherein each instruction is directed to its associated ROM and is configured such that, when the instruction is executed by an execution module, its associated ROM is utilized in executing the instruction, whereby the directive/indicator is used by the execution module in order to indicate to the execution module how the associated ROM should be read, in order to allow the instruction to be executed; and
- an execution module which is configured to retrieve and execute the set of instructions by utilising each instruction's associated directive/indicator and ROM.

17. The system of claim 16, wherein each instruction of the set of instructions has:
- an associated indicator which is incorporated or encoded into the optical symbol and which indicates a data size of the associated ROM to which the particular instruction is directed; and
- an associated directive which is incorporated or encoded into the optical symbol and which indicates a data type of the associated ROM to which the particular instruction is directed,
- wherein, when an instruction from the set of instructions is executed by the an execution module, the associated directive and associated indicator are used by the an execution module in order to indicate to the an execution module how the associated ROM should be read, in order to allow the instruction to be executed.

18. A system for creating an optical symbol which is associated with a particular article, wherein the system includes an encoding module which is configured to encode at least a set of instructions and, for each instruction of the set of instructions, at least one associated directive/indicator and associated ROM, into an optical symbol, wherein each instruction is readable and executable by a computing device/processor, wherein the ROM is associated with the optical symbol, wherein each directive/indicator is structured/configured to indicate to a computing device/processor how to read the associated ROM, and wherein each instruction is directed to its associated ROM and is configured such that, when the instruction is executed by a computing device/processor, its associated ROM is utilized in executing the instruction, whereby the associated directive/indicator is used by the computing device/processor in order to indicate to the computing device/processor how the associated ROM should be read, in order to allow the instruction to be executed.

19. The system of claim 18, wherein the encoding module is configured to encode, for each instruction of the set of instructions:

an associated indicator which is incorporated or encoded into the optical symbol and which indicates a data size of the associated ROM to which the particular instruction is directed; and an associated directive which is incorporated or encoded into the optical symbol and which indicates a data type of the associated ROM to which the particular instruction is directed, wherein, when an instruction from the set of instructions is executed by a computing device/processor, the associated directive and associated indicator are used by the computing device/processor in order to indicate to the computing device/processor how the associated ROM should be read, in order to allow the instruction to be executed.

20. A non-transitory computer-readable storage medium on which instructions are stored which, when executed by a computer/processor, are configured to encode a set of instructions and, for each instruction of the set of instructions, at least one associated directive/indicator and associated ROM into an optical symbol, wherein each instruction is readable and executable by a computing device/processor, wherein the ROM is associated with the optical symbol, wherein each directive/indicator is structured/configured to indicate to a computing device/processor how to read the associated ROM, and wherein each instruction is directed to its associated ROM and is configured such that, when the instruction is executed by a computing device/processor, its associated ROM is utilized in executing the instruction, whereby the directive/indicator is used by the computing device/processor in order to indicate to the computing device/processor how the associated ROM should be read, in order to allow the instruction to be executed.

* * * * *